(12) United States Patent
Colgan et al.

(10) Patent No.: US 6,400,440 B1
(45) Date of Patent: Jun. 4, 2002

(54) PASSIVE LIQUID CRYSTAL DISPLAY HAVING PRE-TILT CONTROL STRUCTURE AND LIGHT ABSORBENT MATERIAL AT A CENTER

(75) Inventors: Evan G. Colgan, Chestnut Ridge; Shui-Chih A. Lien, Briarcliff Manor; Kai R. Schleupen, Yorktown Heights, all of NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/339,263

(22) Filed: Jun. 23, 1999

(51) Int. Cl.[7] .............................................. G02F 1/1337
(52) U.S. Cl. ........................ 349/160; 349/110; 349/129; 349/191
(58) Field of Search ................................. 349/110, 111, 349/123, 129, 143, 139, 124, 160, 130, 191

(56) References Cited

U.S. PATENT DOCUMENTS

| | | | | |
|---|---|---|---|---|
| 5,136,407 A | * | 8/1992 | Clerc ........................... | 359/55 |
| 5,309,264 A | * | 5/1994 | Lien et al. .................... | 359/87 |
| 5,434,687 A | * | 7/1995 | Kawata et al. ................ | 359/63 |
| 5,585,951 A | | 12/1996 | Noda et al. | |
| 5,777,711 A | * | 7/1998 | Sugiyama .................... | 349/143 |
| 5,793,457 A | * | 8/1998 | Tamai et al. ................. | 349/110 |
| 5,835,178 A | * | 11/1998 | Sone et al. .................. | 349/149 |
| 5,880,803 A | * | 3/1999 | Tamai et al. ................. | 349/156 |
| 5,917,572 A | * | 6/1999 | Kurauchi et al. ............ | 349/110 |
| 6,067,141 A | * | 5/2000 | Yamada et al. ............. | 349/129 |
| 6,201,592 B1 | * | 3/2001 | Terashita et al. ............ | 349/156 |
| 6,256,080 B1 | * | 7/2001 | Colgan et al. .............. | 349/129 |

OTHER PUBLICATIONS

Lee et al., "Microscopic Molecular Reorientation of Alignment Layer Polymer Surfaces Induced by Rubbing and Its Effects on LC Pretilt Angles," Macromolecules 1996, vol. 29, No. 27, pp. 8894–8899.
Lien et al., "Multi–Domain Homeotropic Liquid Crystal Display Based on Ridge and Fringe Field Structure," Japanese Journal of Applied Physics, vol. 37 (1998), pp. L597–L599, Part 2, No. 5B, May 15, 1998.

* cited by examiner

*Primary Examiner*—Toan Ton
*Assistant Examiner*—Andrew Schechter

(57) ABSTRACT

In accordance with the present invention, a passive liquid crystal display cell includes a first substrate having a light absorbent material patterned thereon. A first conductive material is formed in a position relative to the light absorbent material for forming one of a data line and a gate line. The position may be over the light absorbent material or below the light absorbent material (and may include transparent layers in between). A second conductive material is spaced apart from the first conductive material by a gap. The gap includes liquid crystal, and the second conductive material forms the other of the data line and the gate line. A pretilt control structure is formed adjacent to the liquid crystal. The gate line and the data line provide an electric field therebetween wherein the pretilt control structure provides pretilt for the liquid crystal to provide a wide viewing angle.

37 Claims, 17 Drawing Sheets

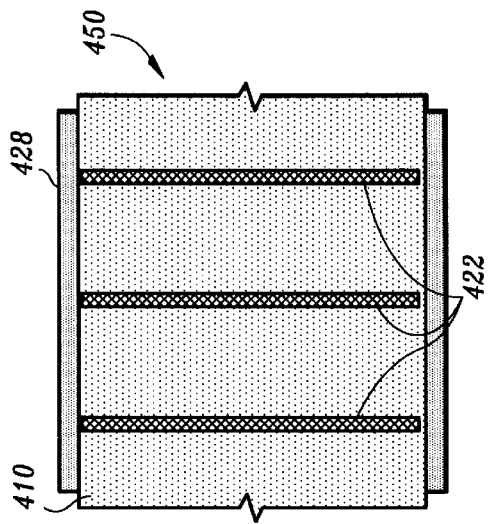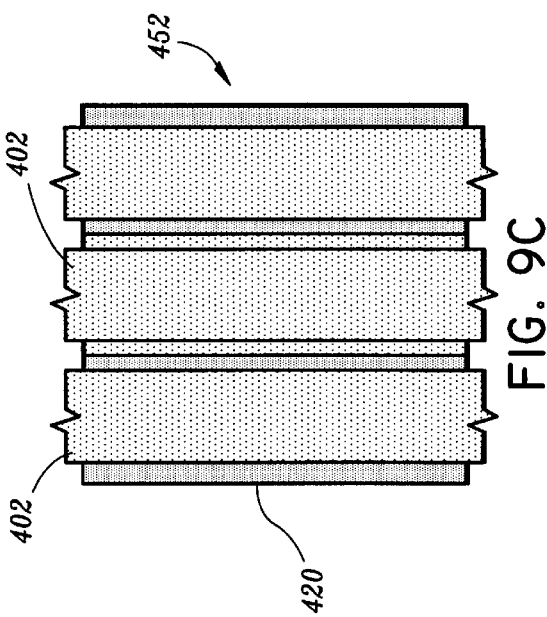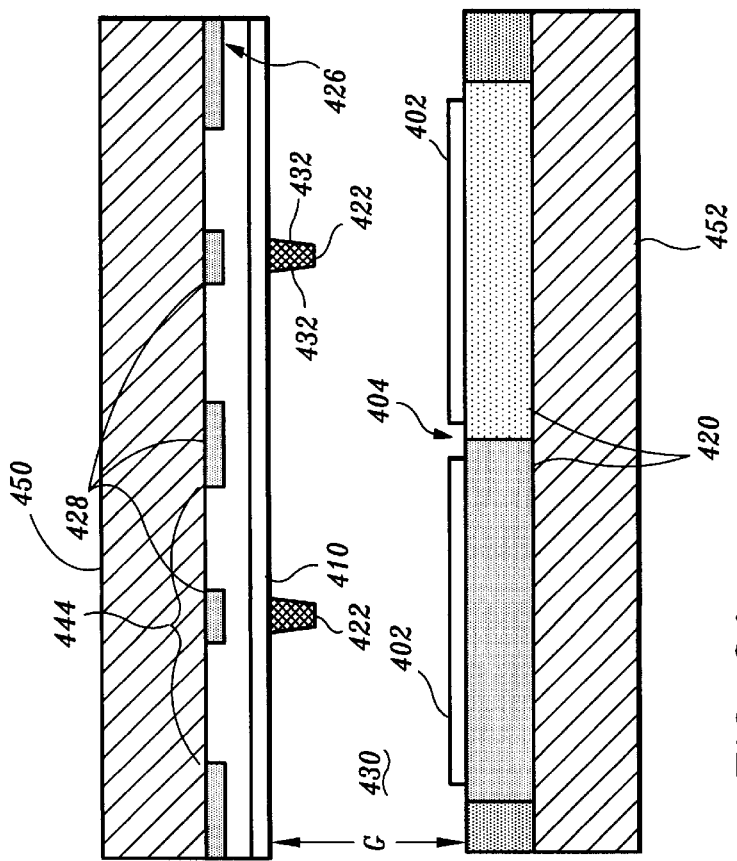

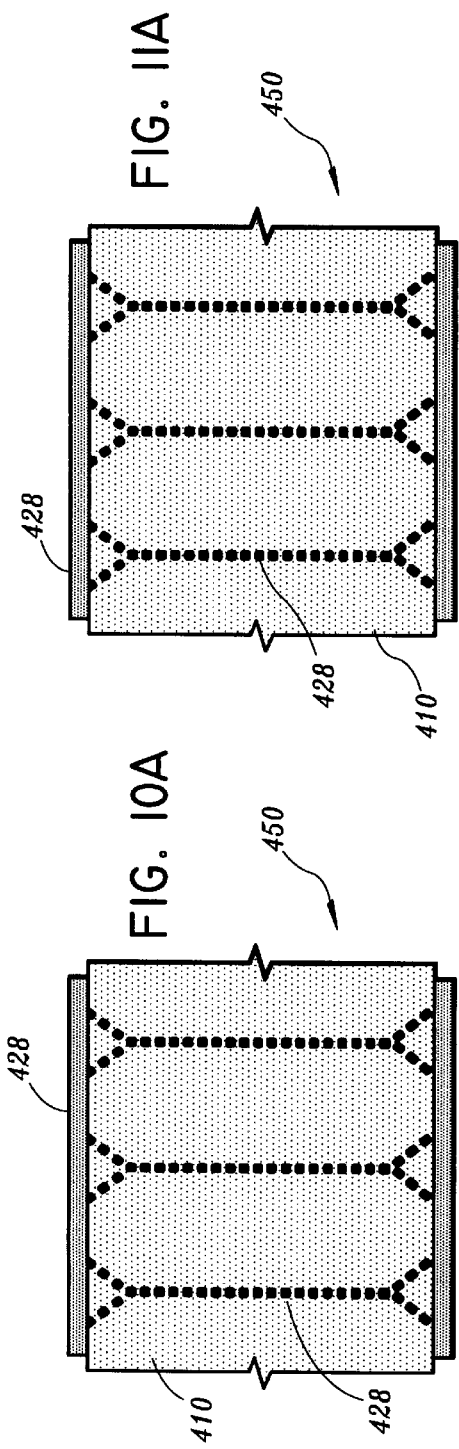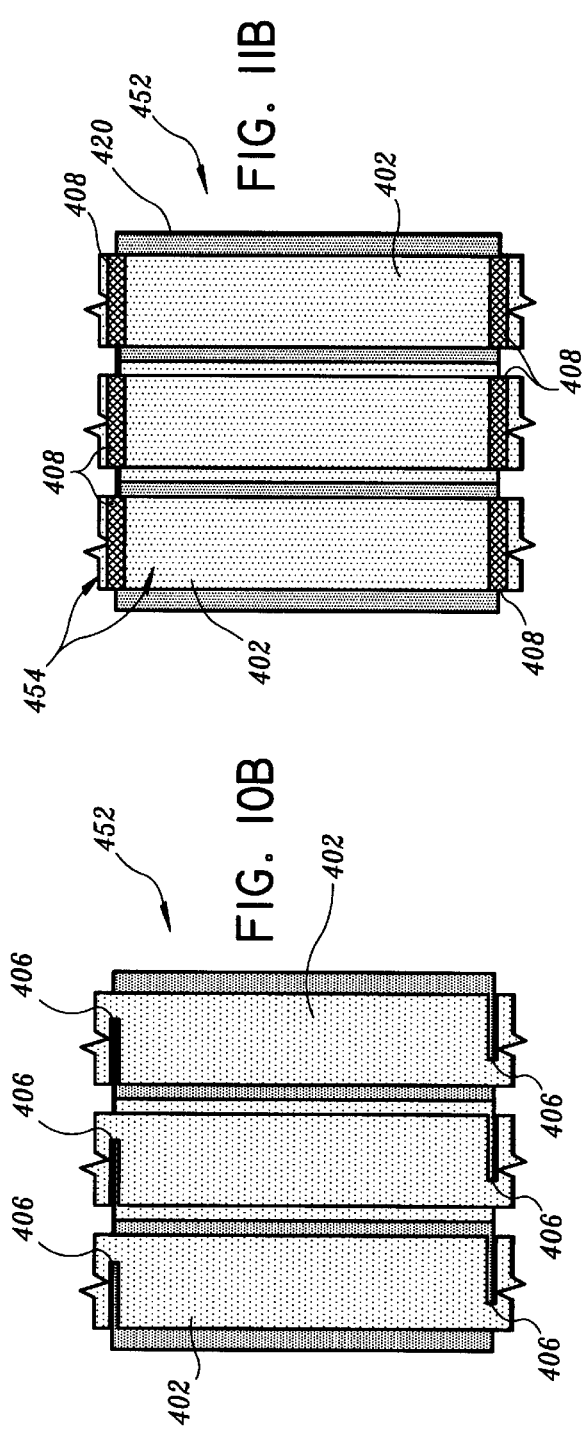

PASSIVE LIQUID CRYSTAL DISPLAY HAVING PRE-TILT CONTROL STRUCTURE AND LIGHT ABSORBENT MATERIAL AT A CENTER

BACKGROUND OF THE INVENTION

1. Field of the Invention

The present invention relates to liquid crystal displays, and more particularly to structures for introducing pretilt to liquid crystal materials for the displays.

2. Description of the Related Art

Flat panel displays have become increasingly important in the computer industry and in other industries where the display of information is important. These types of displays provide unique opportunities for lowering the weight, size, power consumption and eventually the cost of displaying information.

Liquid crystal displays seem to hold the most promise as the technology which will eventually be utilized in almost all practical flat panel displays. Considerable success has been achieved in small size color televisions and in monochrome flat panel displays as well as larger sizes used in color notebook, laptop computers or desk top monitors. However, unlike the cathode ray tube display, which exhibits good viewing quality from a variety of angles, conventional liquid crystal displays suffer from a loss of contrast or contrast reversal when viewed at an angle beyond about 15 degrees from the normal to the plane of the display. This is due to the interaction of light with the molecules of the liquid crystal material in the liquid crystal display cells. Light traveling through these display cells at other than a normal angle of incidence interacts with the liquid crystal display molecules in a manner different from that of light traveling with normal incidence. The contrast between a light transmissive (white) state and a non-transmissive state (black) at other than the normal angle is decreased, thus making such displays less desirable for use in many applications, such as flat panel television screens and large computer screens.

There have been various attempts to solve this problem. One method is discussed in U.S. Pat. No. 5,309,264, commonly assigned to the assignee of the present invention, wherein a pattern of openings is formed in the common electrode. Such openings cause the display elements of the display to have more than one liquid crystal domain. This is an elegant approach; however, to provide sufficient optical performance, the width of such openings is required to be about twice that of the cell gap or larger. Importantly, for high resolution displays (such as ≧120 pixels per inch), the width of a given display element may be on the order of twice or more that of the cell gap. In this case, this method becomes ineffective.

Another approach to solving this problem is to use an in-plane switching LC mode. This has the disadvantage that closely spaced electrodes are needed to provide the required lateral electric fields. The needed electrodes reduce the yield, aperture ratio, and scale poorly to higher resolution displays.

There have been various attempts to provide liquid crystal displays with a wide viewing angle without degrading the contrast ratio or brightness. The wide viewing angle must also be provided at low cost. One method is discussed in application Ser. No. 08/960,826, which is commonly assigned to the assignee of the present invention and incorporated herein by reference.

Referring to FIG. 1, a top view of a conventional liquid crystal display device 30 is shown wherein a pixel electrode 26 is formed below the pixels (6 are shown) of display 30. The pixels are formed between gate lines 32 (3 shown) and data lines 31 (4 shown).

FIG. 2 illustrates a partial cross-section of the conventional liquid crystal display device 30 of FIG. 1. Device 30 includes a first substrate 25 and a second substrate 27 formed of a transparent material such as glass. The two substrates are arranged so as to be parallel to one another with a high degree of precision. Typically, the substrates 25, 27 are separated from one another by a distance of approximately one to twenty microns, and are sealed at their edges (not shown) so as to define a closed interior space there between. First substrate 25 has deposited thereon an array of pixel electrodes 26 which define pixels of the liquid crystal display. Also formed on substrate 25, in selected areas not having electrode films deposited thereon, are semiconductor devices such as diodes or thin film transistors (TFTs) 37. As is well known in the art, there are one or more TFTs 37 for each pixel. TFTs 37 are each controlled by a conductive gate line 32 (not shown) and a conductive data line 31, which are typically deposited on substrate 25 in a manner so as not to be electrically connected to electrodes 26 except that the source of each TFT 37 is electrically connected to one respective electrode 26. Gate lines 32 (not shown) and data lines 31 are also electrically insulated from one another at crossover regions. The second substrate 27 typically has deposited thereon a color matrix layer 23. The color matrix layer 23 typically has a black matrix material 23-1 interleaved with R, G, or B color matrix material 23-2 and is frequently underneath the R, G, B color matrix material. The black matrix material 23-1 is disposed opposite the TFTs 37, data line 31 and gate line 32 (not shown) to block the devices from ambient incident light and prevent light leakage outside the pixel area. The color matrix material 23-2 is disposed opposite the pixel electrode 26. In addition, a continuous electrode 28 is typically formed on the color matrix layer 23 or a transparent overcoat layer. The continuous electrode 28 is preferably formed of a thin transparent layer of a conductive material, such as indium tin oxide (ITO) or other suitable material.

A liquid crystal material 36 fills the space between substrates 25 and 27. The nature of the material depends on the mode of operation of liquid crystal display 30.

The interior surfaces of the liquid crystal display may be coated with respective alignment layers 38 and 40 to provide boundary conditions for the molecules of liquid crystal material 36.

The exterior surfaces of substrates 25 and 27 may have respective optical compensating films 42 and 44 disposed thereon. Finally, respective polarizing films 46 and 48 may be applied over compensation films 42 and 44 (if compensating films are used), respectively, or applied over substrate 25 and 27 (if compensating films are not used), respectively.

Conventional liquid crystal displays of the type illustrated in FIG. 2 are illuminated by a light source (not shown) that is located below the panel (the substrate 25 side) and viewed from above the panel (the substrate 27 side).

Liquid crystal cells typically are characterized by a pixel area and cell gap. The pixel area of a given cell is defined by the width W and the length L of the pixel electrode pattern of the cell as illustrated in FIG. 1. In addition, the cell gap is defined by the distance between the alignment layers 38,40 as shown in FIG. 2.

As illustrated in FIG. 3A, in the case of a homeotropic type LCD, liquid crystal (LC) molecules near the electrodes 26 and 28 are aligned so that the long axes of the LC molecules are almost perpendicular to the electrode surfaces when no electric field is applied between the pixel electrode 26 and the electrode 28. The molecules have a small pretilt angle, typically one to fifteen degrees of tilt, away from the substrate normal. As illustrated in FIG. 3B, when an electric field is applied between the electrodes 26 and 28 of the homeotropic liquid crystal display cell, the molecules are caused to be oriented in a direction substantially perpendicular to the electric field.

Homeotropic liquid crystal cells require a liquid crystal material that exhibits negative dielectric anisotropy, such as ZLI-4788, ZLI-2857 or 95-465MLC manufactured by E. Merck Darmstadt of Germany and available in the United States through EM Industries. The alignment of the LC molecules of the homeotropic cells is typically provided by rubbing alignment layers 38, 40. An example of such rubbing steps is described in K. W. Lee et al., "Microscopic Molecular Reorientation of Alignment Layer Polymer Surfaces Induced by Rubbing and its Effects on LC Pretilt Angles", Macromolecules, Vol. 29, Number 27, 1996, pages 8894–8899. The alignment layers may be formed, for example, from polyimide SE-1211 manufactured by Nissan.

As is well known in the art, homeotropic cells typically use a compensating film to reduce dark state light leakage for light that travels through the liquid crystal display panel in a direction other than perpendicular to the substrates. For best results, the product of the thickness of the liquid crystal material layer in the liquid crystal display cell and the difference between the extraordinary and ordinary indexes of refraction for the liquid crystal display material is equal to or close to the product of the total thickness of the compensating films and the difference between the ordinary and extraordinary indexes of refraction of the compensating film. It is understood by those skilled in the art that other cell configurations may be used.

At least one thin wall (ridge 10, FIG. 4) may be formed on either the pixel electrode 26 or the electrode 28 of the homeotropic liquid crystal display cell. Wall or ridge 10 is preferably formed from a polymeric material or other dielectric material. In the case that the thin wall is formed on the pixel electrode 26, the alignment layer 38 is formed on both the pixel electrode 26 and the thin wall(s). In the case that the thin wall is formed on the electrode 28, the alignment layer 40 is formed on both the electrode 28 and the thin wall(s). The wall(s) produce a liquid crystal pretilt that combines with the lateral electric field from the edges of the pixel electrode 26 defining the LC cell to cause the LC molecules to tilt in a desired direction when a voltage is applied across the pixel. By providing such tilt control, conventional rubbing steps associated with alignment layers can be avoided. Moreover, the geometry of the wall(s) of the cell may be configured to provide for multi-domains in the given pixel.

A pattern of thin wall(s) or ridges 10 may be employed to form a multi-domain liquid crystal cell through a combination of pre-tilt control and a fringe electric field. This is the approach described in application Ser. No. 08/960,826. Some practical difficulties exist in the alignment of the walls and with the display contrast ratio in this approach. For the case shown in FIG. 4, a ridge 10 is made of a transparent insulating material which serves to control the liquid crystal pretilt for multiple domains. A liquid crystal display 8 includes pixel electrodes 12 and data lines 31 disposed on a thin film transistor glass substrate 15. Ridges 10 are formed on a blanket common electrode 28. Common electrode 28 is formed on a color filter layer 23. A black matrix 23-1 is included which absorbs light to prevent scattering and reflection thereof. A color filter glass or substrate 27 is also present.

For the liquid crystal (LC) molecules near the wall(s) or ridges 10, the slope of the side walls and the alignment layer(s) causes the LC molecules near the wall(s) to tilt in a desired direction either when a voltage is applied across the pixel or when a voltage is not applied across the pixel. For the LC molecules away from the thin wall(s), the slope of the side walls and the alignment layer(s) and the lateral electric field from the edges of the pixel electrode 12 defining the LC cell cause the LC molecules away from the thin wall(s) to tilt in a desired direction when a voltage is applied across the pixel. By providing such tilt control, conventional rubbing steps associated with the alignment layers can be avoided. Moreover, the geometry of the wall(s) of the cell may be configured to provide for multi-domains in the given pixel.

For good viewing angle quality, ridge 10 must be accurately centered on the pixel electrode 12 (space "a" and "b" in FIG. 4 are equal, i.e., symmetrically placed relative to the pixel electrode or features forming the fringe field) and for maximum brightness, the width ("X" in FIG. 4) of ridge 10 should be as small as possible. The display contrast ratio is degraded by light leakage around edges 16 of ridge 10 where liquid crystal 36 is aligned to ridge 10.

Therefore, a need exists for a liquid crystal display structure which minimizes light leakage, provides improved contrast ratio and provides a good viewing angle.

SUMMARY OF THE INVENTION

In accordance with the present invention, a passive liquid crystal display cell includes a first substrate having a light absorbent material patterned thereon. A first conductive material is formed in a position relative to the light absorbent material for forming one of a data line and a gate line. The position may be over the light absorbent material or below the light absorbent material (and may include transparent layers in between). A second conductive material is spaced apart from the first conductive material by a gap. The gap includes liquid crystal, and the second conductive material forms the other of the data line and the gate line. A pretilt control structure is formed adjacent to the liquid crystal. The gate line and the data line provide an electric field therebetween wherein the pretilt control structure provides pretilt for the liquid crystal to provide a wide viewing angle.

Another passive liquid crystal display cell, in accordance with the present invention, includes a first substrate having a light absorbent material patterned thereon. The light absorbent material includes a portion disposed at a crossover between a data line and a gate line. A first conductive material is formed in a position relative to the light absorbent material for forming one of a data line and a gate line, and the position may be over the light absorbent material or below the light absorbent material. A second conductive material is spaced apart from the first conductive material by a gap, and the gap includes liquid crystal. The second conductive material forms the other of the data line and the gate line. A pretilt control structure is formed at the crossover and is adjacent to the liquid crystal. The gate line and the data line provide an electric field therebetween wherein the pretilt control structure provides pretilt for the liquid crystal to provide a wide viewing angle and the portions of the light absorbent material absorb light leaked from the pretilt control structure.

In alternate embodiments, the light absorbent material may include a black matrix, and the black matrix may further include a conductive material and the cell may further include a dielectric layer formed between the black matrix and the first conductive material. The pretilt control structure may include a ridge or a trench. The pretilt control structure may include a Y inverse Y structure, an X structure, a T structure, multiple X or T structures and/or a straight line structure on the first conductive layer. Other structures or combinations may be included. The second conductive material may include a data line or gate line extending in a first direction, and the cell may further include gaps and/or notches disposed substantially perpendicular to the first direction and defining pixels. The gaps and/or the notches for providing pretilt control structures for the liquid crystal. The second conductive material may include a gate line or a data line extending in a first direction, and the cell may further include ridges disposed substantially perpendicular to the first direction and defining pixels. The ridges provide pretilt structures for the liquid crystal. The pretilt control structure includes tapered side walls. The liquid crystal may include a negative dielectric anisotropic liquid crystal.

The cell may include a transparent insulation layer disposed on the first conductive layer and the pretilt structure may include a trench formed in the transparent insulation layer. The first conductive material may include a data line or a gate line extending in a first direction, and the cell may further include additional trenches disposed substantially perpendicular to the first direction and formed in the transparent insulation layer. The additional trenches may define pixels and provide-pretilt structures for the liquid crystal. The cell-may further include pretilt control structures formed on opposite sides of the gap and the pretilt control structures on a first side of the gap contact the pretilt control structures on a second side of the gap to provide a spacing for the gap. The cell may include gapping structures formed on opposite sides of the gap to provide a spacing for the gap, and the gapping structures may include color filter layers.

The portions of the light absorbent material at the crossover may include a width and the pretilt control structure may include a width less than the width of the portions of the light absorbent material at the crossover. The pretilt control structure is preferably self-aligned to the portions of the light absorbent material at the crossover. The pretilt control structure preferably includes tapered side walls.

These and other objects, features and advantages of the present invention will become apparent from the following detailed description of illustrative embodiments thereof, which is to be read in connection with the accompanying drawings.

BRIEF DESCRIPTION OF DRAWINGS

The invention will be described in detail in the following description of preferred embodiments with reference to the following figures wherein:

FIG. 9A is a cross-sectional view of an illustrative configuration of the present invention for forming ridges in a passive display;

FIG. 9B is a bottom view of a top plate of FIG. 9A; FIG. 9C is a top view of a bottom plate of FIG. 9A;

FIG. 10A is a bottom view of a top plate of FIG. 9A;

FIG. 10B is a top view of a bottom plate of FIG. 9A showing gaps or notches for providing a vertical fringe field in accordance with the present invention;

FIG. 11A is a bottom view of a top plate of FIG. 9A;

FIG. 11B is a top view of a bottom plate of FIG. 9A showing additional ridges for providing a vertical fringe field in accordance with the present invention;

DETAILED DESCRIPTION OF PREFERRED EMBODIMENTS

Figure 1:
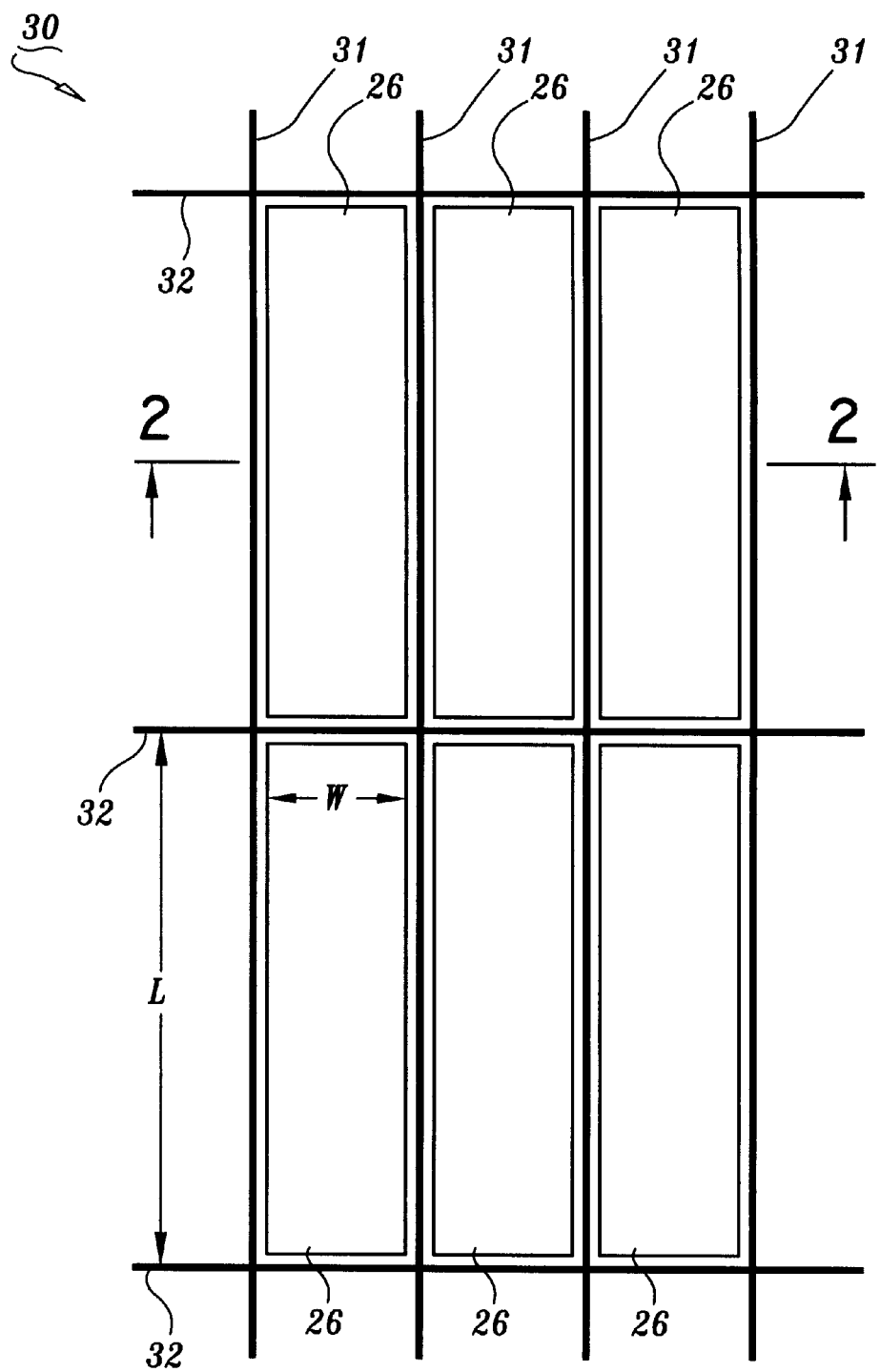
FIG. 1 is a top view of a conventional crossover type active-matrix liquid crystal display device.
Figure 2:
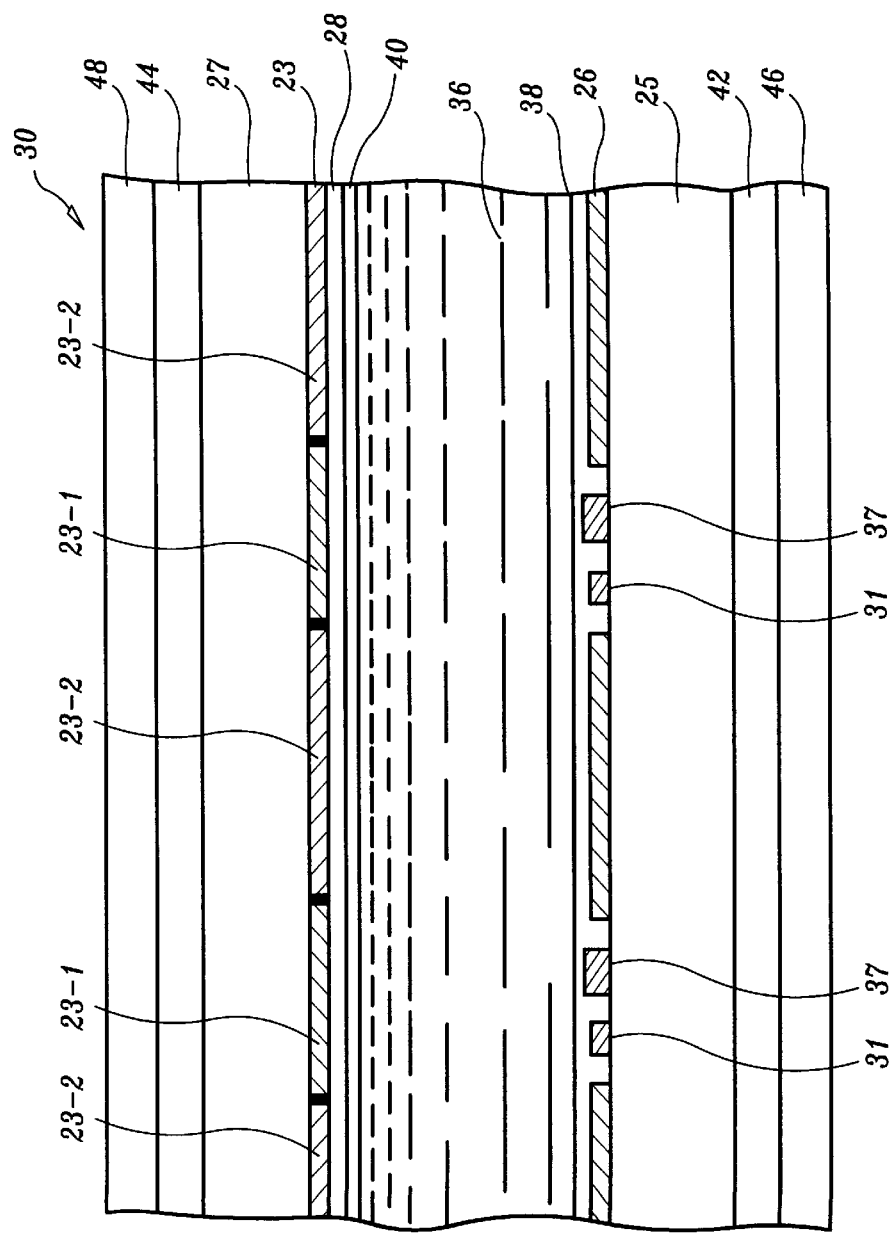
FIG. 2 illustrates a partial cross section (2—2) of the liquid crystal display device of FIG. 1.
Figure 3A:
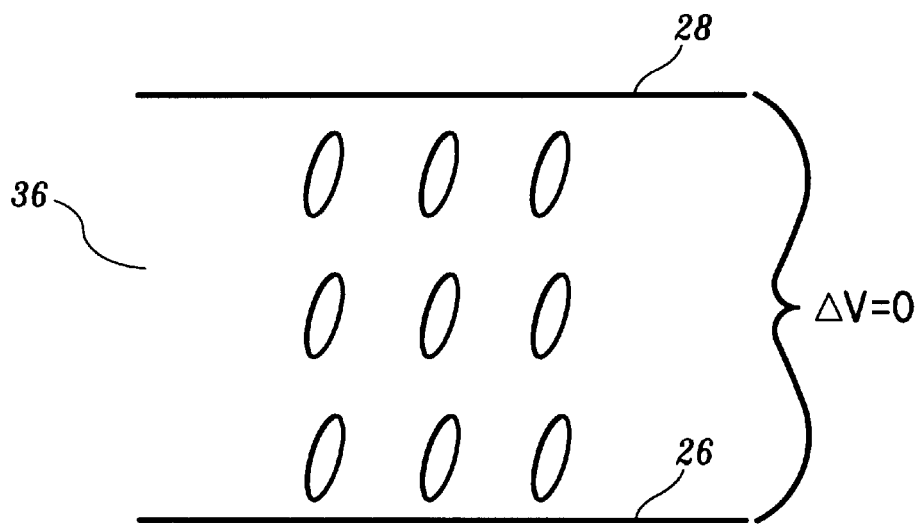
FIGS. 3A and 3B illustrate the orientation of LC molecules in a homeotropic liquid crystal cell.
Figure 3B:
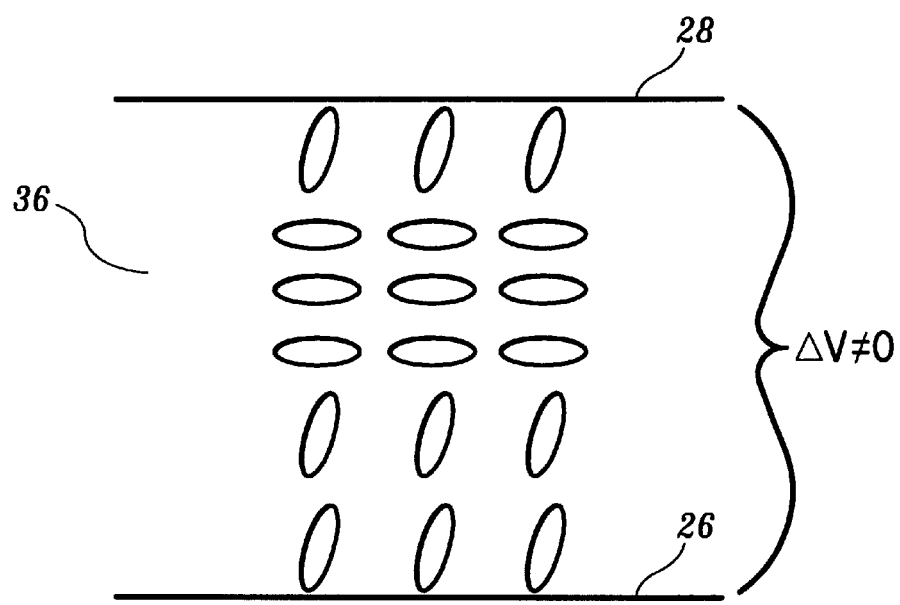

The present invention includes a multi-domain liquid crystal cell employing self-aligned structures, such as ridges or trenches for pre-tilt control. In accordance with the invention, an active matrix liquid crystal display includes a first substrate having a pixel electrode formed thereon, wherein the pixel electrode has a characteristic width; and a second substrate having a transparent conductive electrode layer formed thereon. A passive matrix liquid crystal display has a continuous transparent conductive gate (scan) line which serves as the common electrode for a row of pixels and a continuous transparent conductive data line on the opposite glass plate which serves as the pixel electrodes. Liquid crystal material is disposed between the pixel electrode and the transparent conductive electrode.

In one embodiment of the present invention, at least one ridge of insulating material is self-aligned to a portion of the black matrix material and projects from the transparent conductive common electrode layer (or the gate/scan line in a passive matrix LCD) toward the liquid crystal material. In a preferred embodiment, the liquid crystal includes a negative dielectric anisotropic liquid crystal, i.e. $\epsilon_{\parallel} < \epsilon_{\perp}$. The width of the ridge is less than the characteristic width of the pixel electrode. The ridge preferably has tapered side walls which may be formed by a photo lithographic or etching processes, for example. The ridge(s) provide a pretilt for the liquid crystal which combined with the electric field provided by the edge of the pixel electrode control the tilt direction of the liquid crystal material in the pixel. The ridge is formed by back exposure to be self aligned to a portion of the black matrix material and is narrower then the black matrix material so that the light leakage around the ridge is blocked by the black matrix material. The use of the black matrix to block the light leakage advantageously improves the contrast ratio of the display and permits the black matrix blocking layer to be much narrower then if conventional lithography were employed. For backexposure through the black matrix, the ridge material needs to be a positive tone photosensitive material or a transparent insulator which is patterned with a positive tone resist. A second exposure from the front with a mask may be used to remove the ridge material in areas outside of the open aperture where it is not desired.

In another embodiment, a trench of transparent insulating material is self-aligned to a portion of the TFT array in the pixel electrode (or the data line in a passive matrix LCD) area using a negative resist. The width of the trench is less than the characteristic width of the pixel electrode and the trench preferably has tapered side walls. The trenches provide a pretilt for the liquid crystal, which combined with the electric field provided by the edge of the pixel electrode, control the tilt direction of the liquid crystal material in the pixel. The trench is formed by back exposure to be self aligned to an opaque layer formed on the TFT plate and is narrower than the opaque material. The use of the opaque material blocks the light leakage around the edge of the trench, improves the contrast ratio of the display and permits the black matrix blocking layer to be narrower then if conventional lithography was used. It is desirable that the opaque material have a low reflectivity. Note that the trench material needs to be a negative tone photosensitive material and transparent after processing or a transparent insulator could be used which is patterned with a negative tone resist. The opaque material could be composed of the metal layers used for the gate or data lines.

The structures herein have been described in terms of active matrix displays but they are equally applicable to passive matrix displays where the vertical gaps between the data lines serve to provide the lateral fringe-field and if an additional fringe field is needed, additional slits or notches could be added to the data lines or additional ridges or trenches could be used to provide an additional fringe-field.

Figure 4:
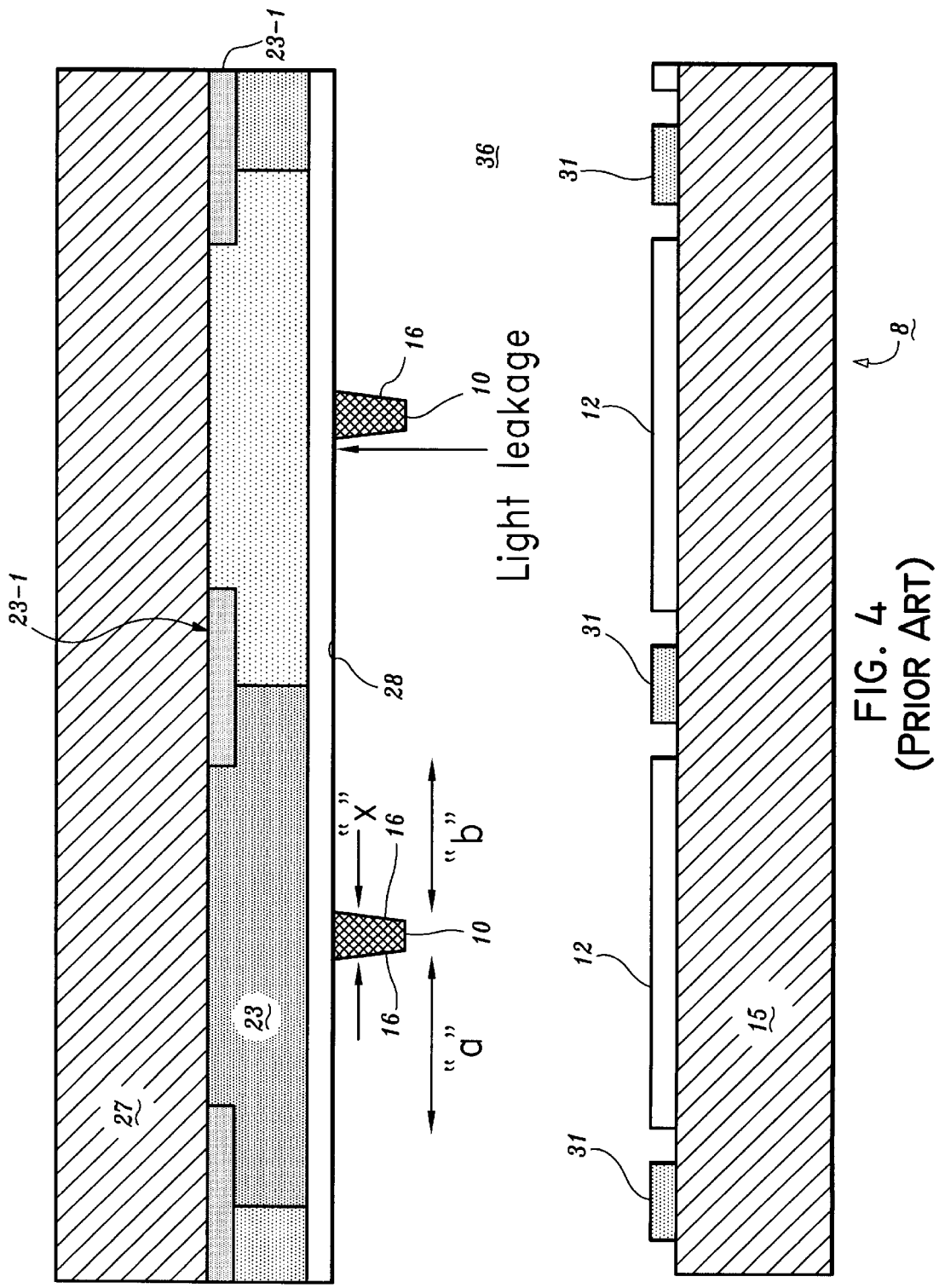
FIG. 4 is a cross-sectional view of a prior art ridge fringe field structure.

Referring now to the drawings in which like numerals represent the same or similar elements and again to FIG. 4, a cross-sectional view of the previously disclosed ridge and fringe field multi-domain homeotropic (RFFMH) liquid crystal display is shown. As described above, one disadvantage of this configuration is light leakage around the ridge 10 due to the alignment of the liquid crystal to the edges of the ridge. The light leakage may be blocked by attempting to add black matrix under the ridge by changing the mask used to pattern the black matrix. This has a number of disadvantages though. In standard color filter manufacturing contact printers are used in the photolithography instead of steppers because the cost is much lower and the finer resolution features and more accurate overlay control are not required.

With a contact printer, the smallest feature size which can be typically achieved is about 5microns and the overlay accuracy between levels is 5 microns for the glass sizes used to make color filters. If a contact printer were used to make a black matrix layer to mask the ridge, to insure that the ridge is hidden by the black matrix layer, the black matrix would need to be 17 microns wide (5 microns for the width of the ridge, 5 microns on each side for alignment error, and 1 micron on each side of the ridge for the region of light leakage). This would block an unacceptably large percentage of the open aperture and greatly reduce the brightness of the display. A stepper could be used to form the ridge layer which would permit a narrower ridge with accurate alignment to the black matrix but this would increase the manufacturing costs too much. The alignment of the ridge to the pixel electrode is needed, any misalignment ("a" not equal to "b" in FIG. 4) will cause the LC domains formed on the left and right side of the ridge to have different electro-optical response, i.e. for a given voltage on the pixel electrode the amount of light transmitted will differ. This is especially true for displays with 24-bit color where greater gray scale accuracy is needed.

For a typical subpixel which is about 70–100 microns wide, an alignment error of less than 3 microns is desirable. This is difficult to achieve in the previously disclosed configuration (FIG. 4) because of the combination of the alignment errors. The ridge 10 is aligned to the black matrix 23-1 with a contact printer, so the overlay error can be as large as 5 microns (though the alignment is typically better). When the liquid crystal cell is assembled, the color filter plate 27 (using alignment marks formed in the black matrix) is aligned to the TFT plate 15 with an accuracy of better than 3 microns (usually within 1 micron). So the compound error could be as large as 8 microns. There would be no advantage in using alignment marks on the color filter plate formed from the ridge material because the open aperture of the display would need to be reduced to insure that the black matrix covers the liquid crystal disclinations which form around the edge of the pixel electrode and this decrease in brightness would not be acceptable. Additionally, it would be desirable to reduce the ridge width in the previously disclosed structure ("X" in FIG. 4) so that the open aperture of the display is as large as possible.

Figure 5:
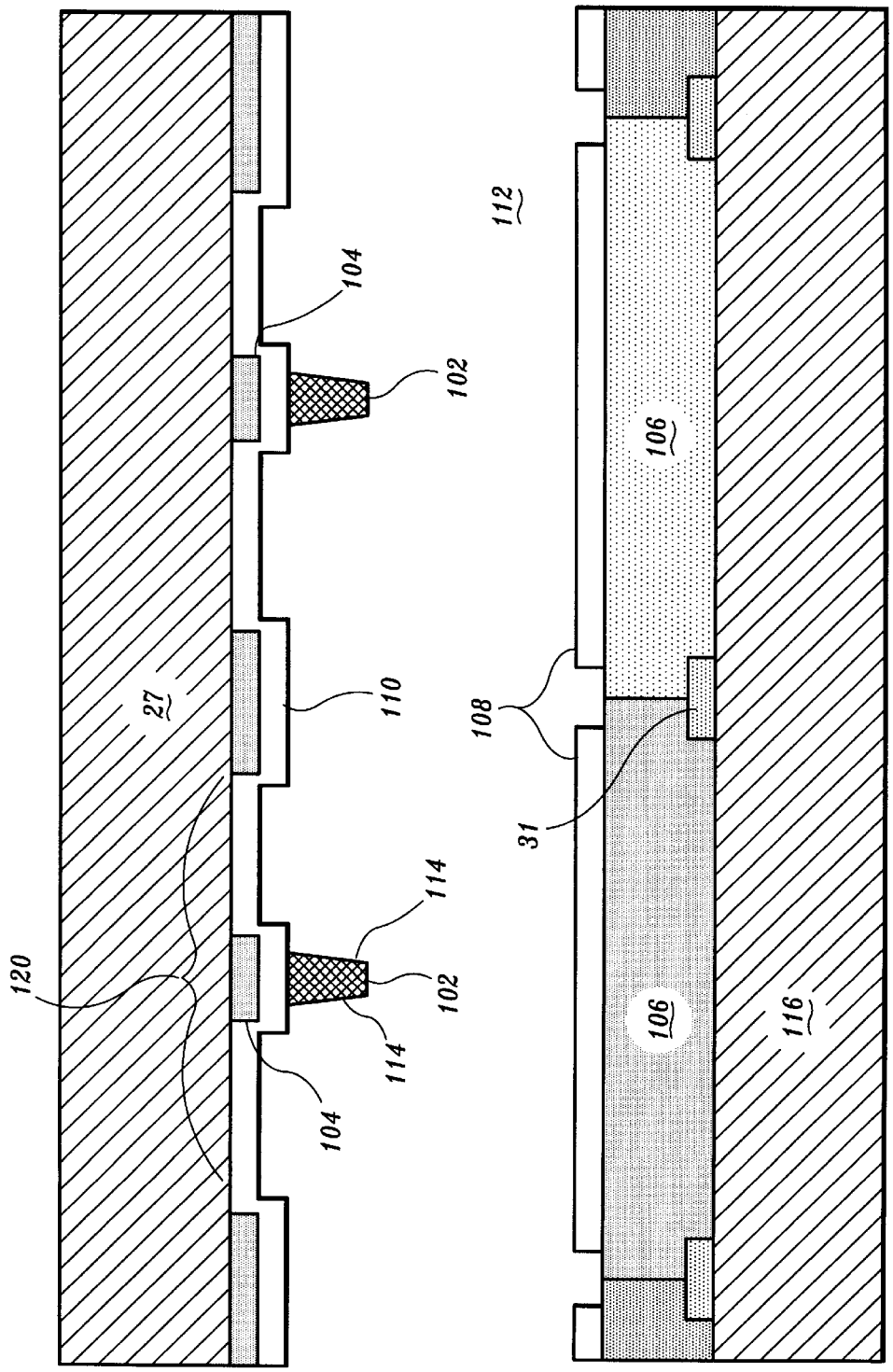
FIG. 5 is a cross-sectional view of an embodiment of the present invention showing self-aligned ridges.

Referring to FIG. 5, a cross-sectional view of one embodiment of the present invention is shown. The above stated problems and related problems of the prior art are solved by using ridges 102 which are self-aligned to a black matrix 104. As shown in FIG. 5, color filters 106 are integrated under pixel electrodes 108 which permits an increased open aperture area as has been described in U.S. Pat. No. 5,585,951 to Noda et al. and incorporated herein by reference. Ridges 102 are preferably formed using a "positive tone" (remains where not exposed) photosensitive polymer material (positive resist) and a combination of back exposure and front exposure with a mask after black matrix 104 has been patterned and a common electrode 110 has been deposited.

The polymer material is an insulator and compatible with the liquid crystal 112 used. Side walls 114 of the polymer material are preferable tapered by the photoprocessing (combination of exposure and developing, or a thermal anneal may be used to "slump" the polymer material to form a taper).

Alternatively, a transparent insulator may be deposited over patterned black matrix 104 and a transparent common electrode 110 and patterned with a photoresist which is exposed by a combination of back exposure and front exposure with a mask. The etching method for the transparent insulator would preferably result in tapered side walls 114. The use of a back exposure step results in ridge 102 being self-aligned to black matrix 104 and in the ridge edge starting about 1 micron inside of the edge of black matrix material 104. The distance between the edge of black matrix 104 and the edge of ridge 102 can be adjusted by changing the back exposure dose or by the degree of columnation of the light used for back exposure.

Since the width of the self-aligned ridge 102 is less than the width of the black matrix pattern, the region of light leakage around the ridge can be hidden from the viewer by black matrix 104. Additionally, since the ridge is self-aligned to black matrix 104, the alignment error of ridge 102 to pixel electrode 108 is only the error in alignment between color filter plate 116 and a thin film transistor (TFT) plate 127 during cell assembly (less then 3 microns, and usually within 1 micron). This improves yield and reduces loss from misalignment of ridge 102 to the pixel and permits the ridge and fringe field multi-domain homeotropic (RFFMH) concept of the present invention to be extended to higher resolution displays (i.e., smaller pixel sizes) and displays with greater color accuracy (for example, 24-bit color). Further, black matrix features which are used to form ridge 102 can be as narrow as the contact printer can reliably resolve (about 5 microns) so an open aperture area 120 that is blocked is minimized. Since ridge 102 is defined by back exposure, it can be narrower than could be formed directly by the contact printer, 3 microns, for example, with a 5 micron black matrix feature.

Figure 6:
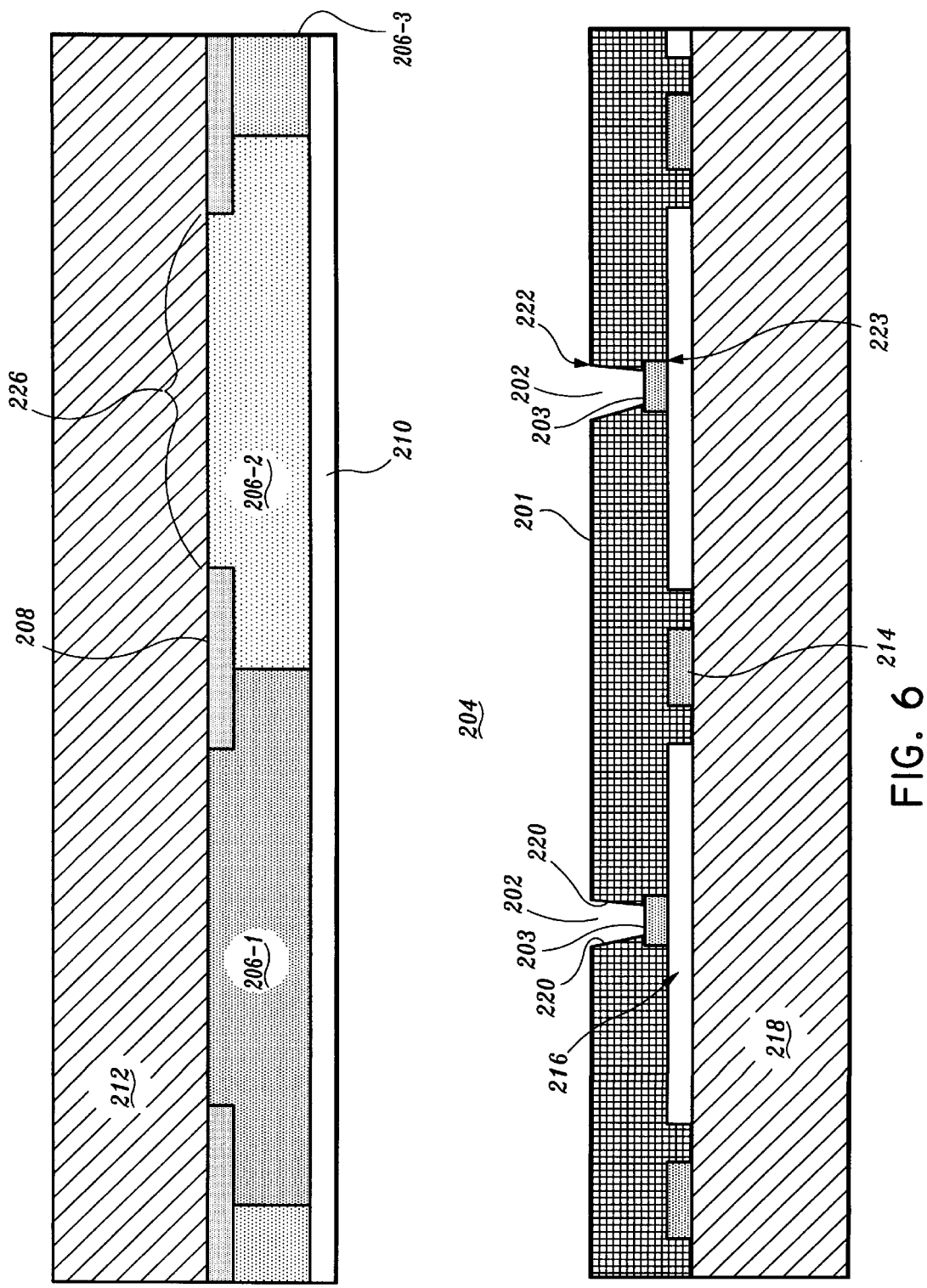
FIG. 6 is a cross-sectional view of another embodiment of the present invention showing self-aligned trenches.

Referring to FIG. 6, a cross-sectional view of a second embodiment of the present invention is shown. Trenches 202 are provided in a transparent insulating polymer 201 and are self-aligned to an opaque feature 203 on a TFT plate 218. For the embodiment shown in FIG. 6, color filters 206 are employed wherein a black matrix 208, Red, Green, and Blue filters 206-1, 206-2 and 206-3, and a common electrode 210 are disposed on a substrate 212 (or color filter plate 212). Addressing busses, i.e., gate lines (not shown) and data lines 214, thin film transistors (not shown), storage capacitors (not shown), and pixel electrodes 216 are on a second substrate 218 (or TFT plate 218).

Trenches 202 in FIG. 6 are preferably formed using a "negative tone" (i.e., remains where exposed) photosensitive polymer material (negative resist) and a combination of back exposure and front exposure with a mask after transparent pixel electrodes 216 have been patterned. The polymer material is an insulator, compatible with the liquid crystal 204 used, and transparent after processing is complete. Side walls 220 of the polymer are preferable tapered by the photoprocessing (combination of exposure and developing, or a thermal anneal could be used to "slump" the polymer to give a taper). Alternatively, a transparent insulator could be deposited over the patterned pixel electrode 216 and patterned with a photoresist which is exposed by a combination of back exposure and front exposure with a mask.

The etching method for transparent insulator 201 preferably results in tapered side walls 220. The use of a back exposure step results in trench 202 being self-aligned to opaque feature (or opaque material) 203 on TFT plate 218. Trench edges 222 may begin about 1 micron inside of an edge 223 of opaque feature 203. The distance between the edge of opaque feature 203 and the edge of trench 202 can be adjusted by changing the back exposure dose or by the degree of columnation of the light used for back exposure. Since the width of the self-aligned trench 202 is less than the width of opaque feature 203, the region of light leakage around trench 202 can be hidden from the viewer by black matrix 208 and opaque feature 203. Additionally, since the ridge is self-aligned to opaque feature 203, the alignment error of trench 202 to pixel electrode 216 is only the overlay error of the stepper used to pattern opaque material 203 and pixel electrode 216 which may be about 1 micron or less. This greatly reduces the yield loss from misalignment of trench 202 to pixel electrode 216 and allows the RFFMH concept to be extended to higher resolution displays (i.e., smaller pixel sizes) and displays with greater color accuracy (e.g., 24-bit color for example). Further, opaque feature 203 which is employed to form trench 202 can be as narrow as the stepper can reliably resolve (about 2–3 microns) so an open aperture area 226 blocked is minimized. Opaque feature 203 may preferably be formed from the same metal film as is used for gate metal or data metal so that additional processing steps are not needed.

Note that part of opaque feature 203 may be formed on one level from one opaque material and the remainder of the opaque feature could be formed on a separate electrically isolated level. For example, overlapping portions of data metal and gate metal may be used where they are electrically isolated from each other. An advantage of this is that near the gate line a segment of data metal could be used and near the data line a segment of the gate metal could be used and multiple overlapping insulating segments could be employed to ensure that no short circuits are formed between the addressing lines. This may be desirable to reduce the possibility of opaque feature(s) causing electrical shorts. It is also desirable that the opaque feature(s) have a low reflectivity to maintain the contrast ratio in the dark state when reflected light from the front which is not attenuated by the two passes through the polarizer and the color filter could be visible. Note that if the transparent electrode is insulated from the opaque feature, the combination of the two of them can be used to form a storage capacitor for the pixel. Although FIGS. 5 and 6 depict transmissive displays, the present invention is applicable to reflective displays as well where the self-aligned features are on the same substrate as the transparent pixel or the common electrode.

Figure 8:
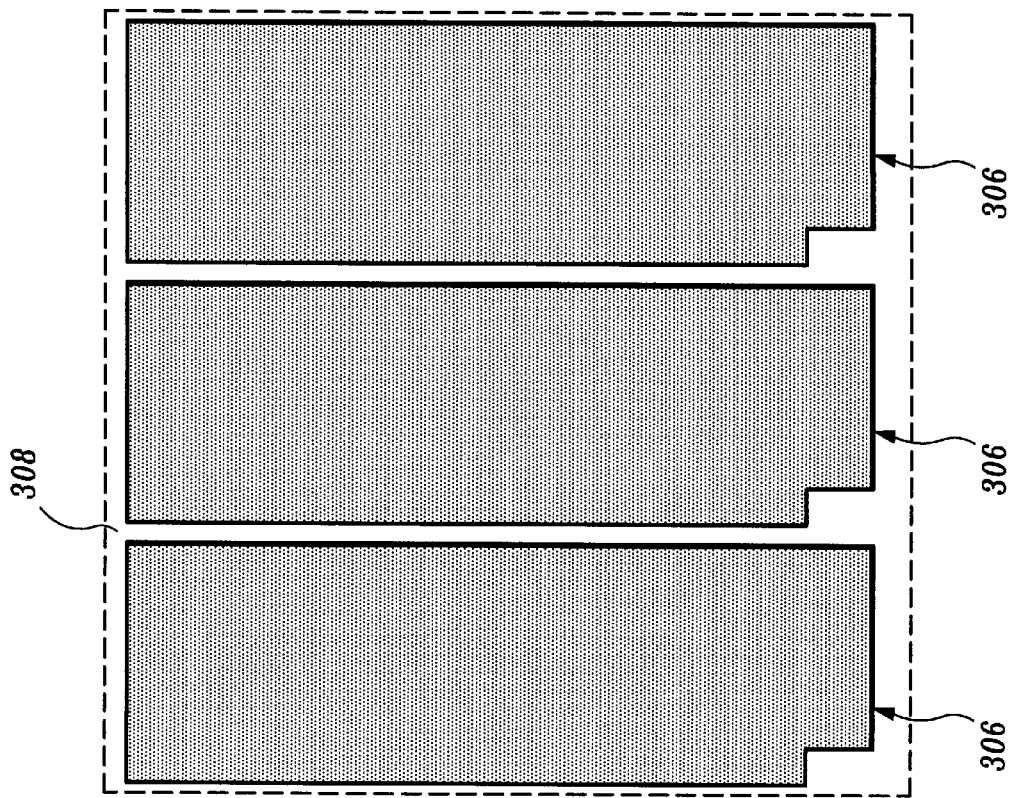
FIGS. 7 and 8 are top views of illustrative configurations of masks for a black matrix level and for the front side exposure of a ridge material for the embodiment shown in FIG. 5.
Figure 7:
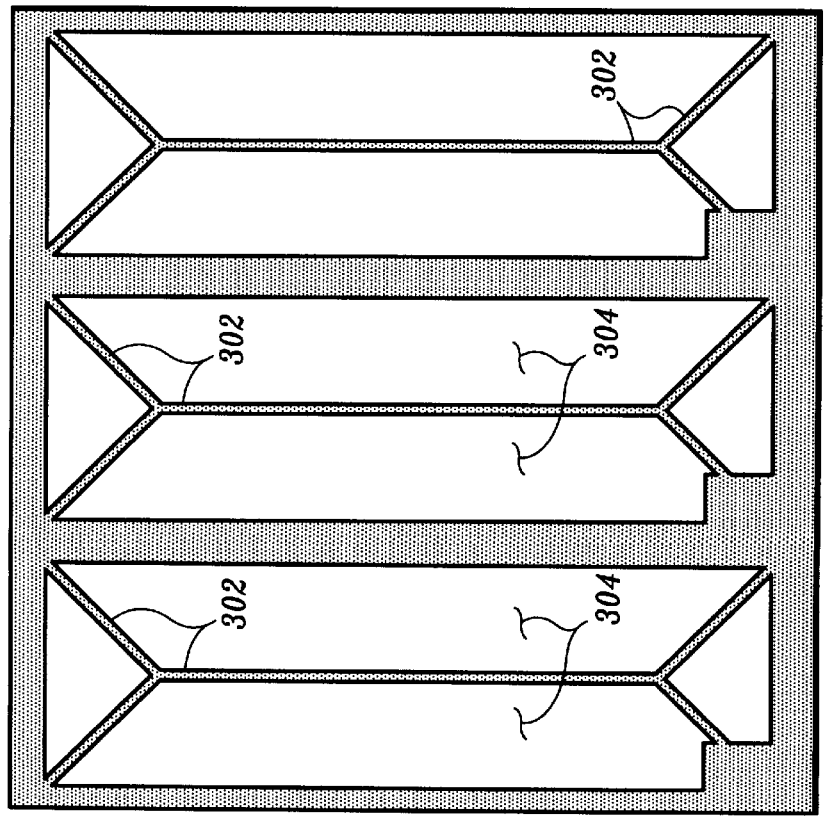

Referring to FIGS. 7 and 8, top views of illustrative configurations of a mask for a black matrix for forming a ridge in accordance with the invention is shown. In FIG. 7, black matrix line 302 extends across a pixel area 304 and is used to prevent exposure of the photosensitive ridge material from being exposed to light as described above during backexposure. In FIG. 8, a front side exposure mask 306 is shown for the embodiment in FIG. 5. Mask 306 is employed to remove ridge material outside of a pixel area 308.

For the embodiment shown in FIG. 6, the center "double Y" (or Y inverse Y) shape similar to that shown in FIG. 7 (but smaller than the actual black matrix opening) would be patterned from opaque feature layer(s) and a mask similar to that shown in FIG. 8 (but smaller) would be used for the front side exposure of trench material. The use of a front side exposure is necessary to remove the ridge material from the area outside the pixel in the embodiment of FIG. 5 and prevent a trench from being formed in the area outside the pixel in the embodiment of FIG. 6 as either of these would provide an undesired pretilt control to the liquid crystal.

Referring to FIGS. 9A–9C, 10A–10B and 11A–11B, different views for other embodiments of the present invention for passive matrix displays are illustratively shown. The application of the RFFMH method has not been previously described for passive matrix displays. A lateral fringe electric field can be provided by gaps 404 between addressing (data) lines 402 and, if required, additional fringe fields can be provided by notches or gaps 406 in data lines 402 along the edges of subpixels (shown in FIGS. 10A and 10B) or by an additional ridge features 408 (shown in FIGS. 11A and 11B).

To provide the additional fringe fields, notches or gaps 406 in data line 402 preferably need to be about or wider than approximately two times the cell gap (G in FIG. 9A). In FIGS. 9B, 10A and 11A, gate (or scan) lines 410 extend across the whole display and data lines 402 in FIGS. 9C, 10B and 11B extend along the display as shown.

Referring to FIGS. 9A–9C, FIG. 9A is a cross-sectional view of a passive display. FIG. 9B is a bottom view of a top glass 450, and FIG. 9C is a top view of a bottom glass 452. Color filters 420 are integrated under data lines 402 and self-aligned ridges 422 are formed on the gate (scan) lines 410 and no provision is made to form a vertical fringe 5 field in this figure. A ridge 422 is preferably formed using a "positive tone" (i.e., remains where not exposed) photosensitive polymer material and a combination of back exposure and front exposure with a mask after a black matrix 428 has been patterned. A transparent insulating overcoat layer 426 is applied over black matrix 428, and a transparent conducting gate line 410 is formed and patterned. Transparent insulating overcoat layer 426 is needed to electrically isolate black matrix 428 from gate lines 410. If black matrix 428 is formed from an insulating material, such as a black polymer, an insulating overcoat layer would not be needed. The polymer material is an insulator and compatible with a liquid crystal 430 used. A side wall 432 of the polymer material used for ridge 422 is preferably tapered by the photoprocessing (combination of exposure and developing, or a thermal anneal could be used to "slump" the polymer to give a taper).

Alternatively, a transparent insulator could be deposited over the patterned black matrix 428 and transparent gate line 410 and patterned with a photoresist which is exposed by a combination of back exposure and front exposure with a mask. The etching method for the transparent insulator would preferably result in tapered side walls. The use of a back exposure step results in ridge 422 being self-aligned to black matrix 428 and the ridge edge may begin at about 1 micron inside of the edge of the black matrix material. The distance between the edge of the black matrix and the edge of the ridge can be adjusted by changing the back exposure dose or by the degree of collimation of the light used for back exposure. Since the width of the self-aligned ridge is less than the width of the black matrix pattern, the region of light leakage around the ridge can be hidden from the viewer by the black matrix. Additionally, since the ridge is self-aligned to the black matrix, the alignment error of the ridge to the data lines is only the error in alignment between two glass plates 440 and 442 during cell assembly (less then 3 microns, usually within 1 micron). This improves yield and reduces loss from misalignment of the ridge and allows the RFFMH concept to be extended to higher resolution displays (smaller pixel sizes) and displays with greater color accuracy.

Further, the black matrix feature which is used to form the ridge can be as narrow as the contact printer can reliably resolve (about 5 microns) so the open aperture area 444 blocked is minimized. Since ridge 422 is defined by back exposure, it can be narrower than could be formed directly by the contact printer, 3 microns for example with a 5 micron black matrix feature.

Two further variations which provide a vertical fringe field are shown in FIGS. 10A–10B and 11A–11B. FIGS. 10A and 11a are alternate bottom views of a top glass 450, and FIGS. 10b and 11b are alternate top views of a bottom glass 452 for different embodiments of the present invention.

As shown in FIGS. 10A and 10B, data line 402 either has gaps or notches 406 (shown in FIG. 10B) formed in it with a width as described previously. As shown in FIGS. 11A and 11B, ridges 408 are formed on the bottom glass parallel to the direction of gate lines 410 and between pixels 454 as shown in FIG. 11B. Ridges 408 in this case may not be formed by a self aligned process. Ridges 422 may be employed in combination with gaps or notches 406 and/or ridges 408 to improve viewing angles of the display in accordance with the present invention.

Figure 14A:
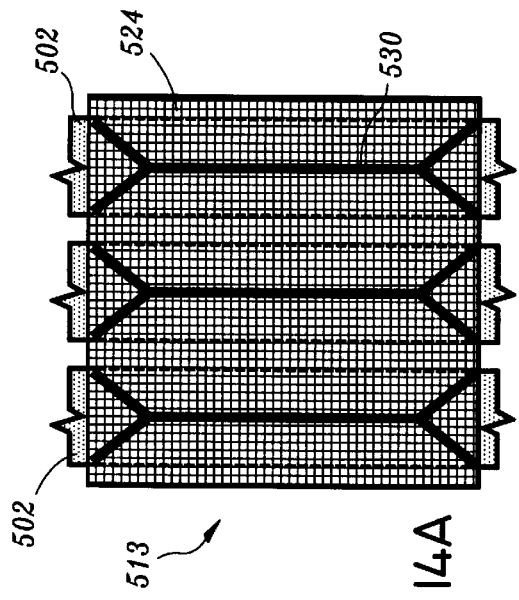
FIG. 14A is a bottom view of a top plate of FIG. 12A.
Figure 14B:
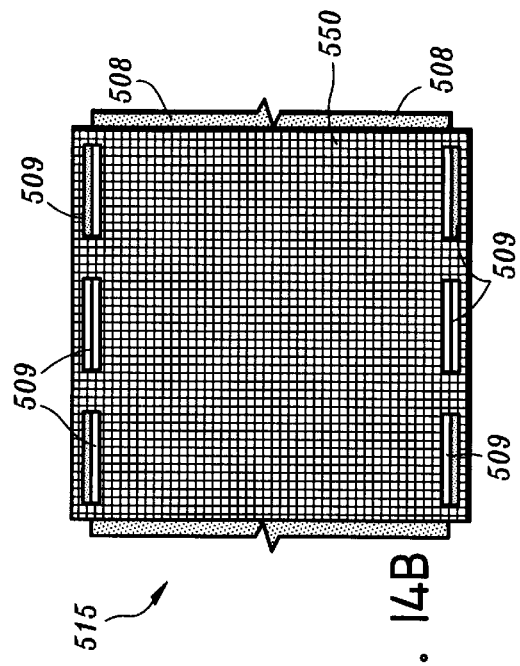
FIG. 14B is a top view of a bottom plate of FIG. 12A showing additional trenches for providing a vertical fringe field in accordance with the present invention.

Referring to FIGS. 12A–12C, 13A–13B and 14A–14B, different views for other embodiments of the present invention for passive displays are illustratively shown. A lateral fringe electric field can be provided by gaps 504 between addressing (data) lines 502 and, if needed, vertical fringe fields can be provided by notches or gaps 506 in data lines 502 along the edges of subpixels (shown in FIG. 13A) or alternatively by forming additional trenches 509 (FIG. 14B).

Figure 12B:
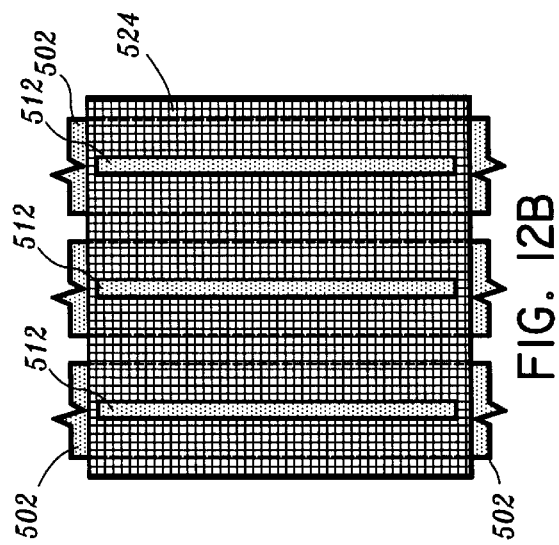
FIG. 12B is a bottom view of a top plate of FIG.
Figure 12C:
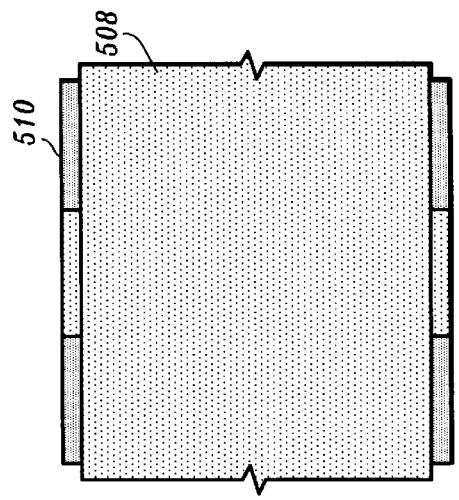
FIG. 12C is a top view of a bottom plate of FIG. 12A.
Figure 13A:
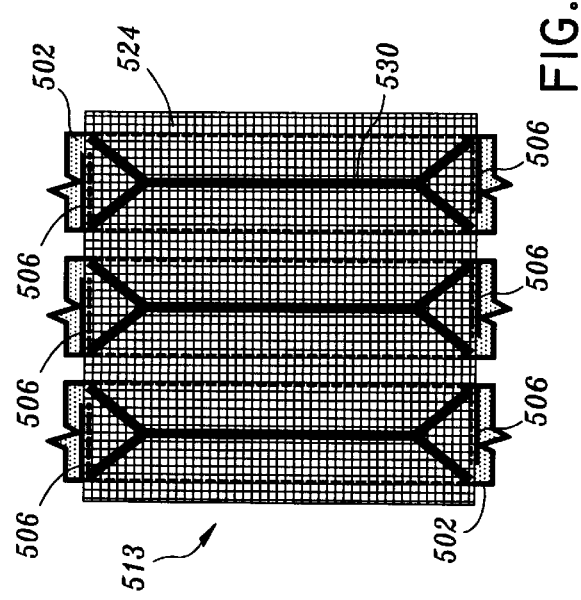
FIG. 13A is a bottom view of a top plate of FIG. 12A showing gaps or notches in data lines in accordance with the present invention.
Figure 13B:
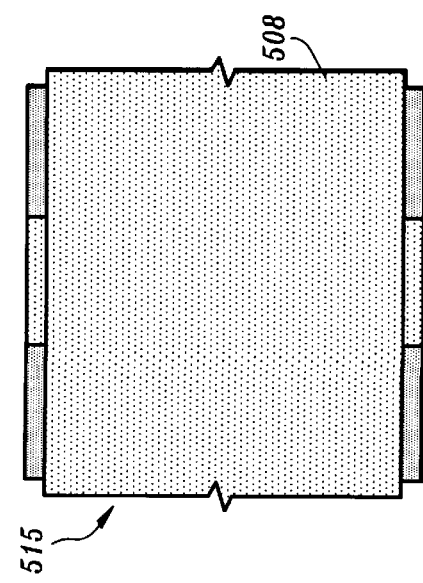
FIG. 13B is a bottom view of a top plate of FIG. 12A.
Figure 15:
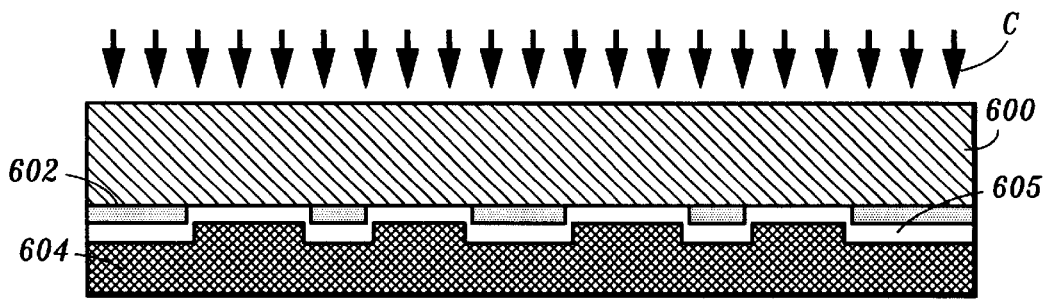
FIG. 15 is a cross-sectional view of an illustrative display device showing back exposures of a resist for forming self-aligned pretilt structures in accordance with the present invention.

In FIGS. 12C, 13B, and 14B, gate lines 508 extend laterally across the whole display, and data lines 502 in FIGS. 12B, 13A and 14A extend perpendicularly to gate lines 502 for the full length of the display.

Figure 12A:
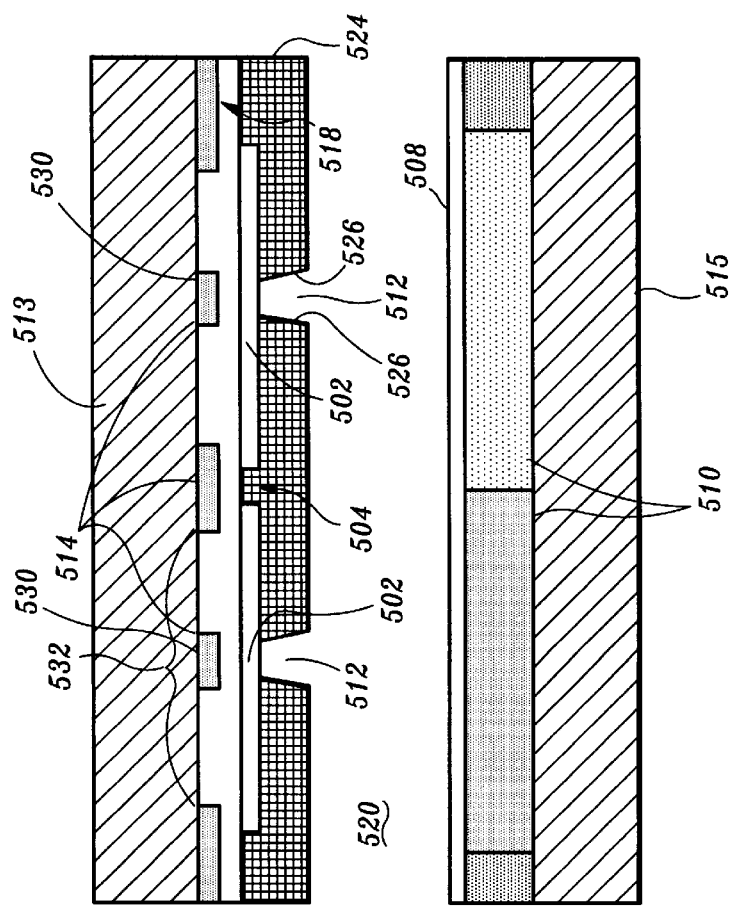
FIG. 12A is a cross-sectional view of an illustrative configuration of the present invention for forming trenches for a passive display.

Referring to FIGS. 12A–12C, color filters 510 are integrated under gate lines 508 on a substrate 515 (or bottom glass 515), and self-aligned trenches 512 are formed with black matrix 514 and data lines 502 on a top glass 513 and no provision is made to provide a vertical fringe field in FIGS. 12A–C. Trench 512 is preferably formed using a "negative tone" (i.e., remains where exposed) photosensitive polymer material and a combination of back exposure and front exposure with a mask after the black matrix 514 has been patterned. A transparent insulating overcoat layer 518 is applied, and transparent conducting data lines 502 are patterned. Transparent insulating overcoat layer 518 is needed to electrically isolate the black matrix 514 from data lines 502. If black matrix 514 is formed from an insulating material, such as a black polymer, insulating overcoat layer 518 would not be needed. The black polymer material may be an insulator although a conductive material may be used in conjunction with transparent insulating overcoat layer 518.

Trenches 512 are preferably formed from a transparent insulation layer 524 such as a polymer. Side walls 526 of trenches 512 are preferably tapered by the photoprocessing (combination of exposure and developing, or a thermal anneal could be used to "slump" the polymer to give a taper). Alternatively, a transparent insulator could be deposited over the patterned black matrix 514 and the transparent data lines 502 and patterned with a negative tone photoresist which is exposed by a combination of back exposure and front exposure with a mask.

The etching method for the transparent insulator 524 preferably results in tapered sidewalls 526. The use of a back exposure step results in trenches 512 being self-aligned to the black matrix 514 and results in the trench edge starting about 1 micron inside of the edge of the black matrix material. The distance between the edge of the black matrix 514 and the edge of the trench 512 may be adjusted by changing the back exposure dose or by the degree of collimation of the light used for back exposure. Since the width of the self-aligned trench 512 is less than the width of the black matrix pattern, the region of light leakage around the trench can be hidden from the viewer by the black matrix 514. Additionally, since the trench 512 is self-aligned to the black matrix 514, the alignment error of the trench to the data lines is only the error in overlay for the lithographic exposure tool used. This improves yield and reduces loss from misalignment of the trench and allows the RFFMH concept to be extended to higher resolution displays (smaller pixel sizes) and displays with greater color accuracy. Further, black matrix features 530 which are used to form trenches 512 can be as narrow as the lithography tool used can reliably resolve (about 5 microns) so an open aperture area 532 blocked is minimized.

Since trench 512 is defined by back exposure, it can be narrower than could be formed directly by the contact printer, 3 microns for example with a 5 micron black matrix feature.

Two further variations which provide a vertical fringe field are shown in FIGS. 13A–13B and 14A–14B. FIGS. 13A and 14a show a bottom view of a top glass 513 for two different embodiments while FIGS. 13B and 14B show a top view of a bottom glass 515. These views are similar to those shown in FIGS. 12B and 12C.

Referring to FIG. 13A and 132, a shape of a self-aligned trench may be modified from that shown in FIG. 12A, and data line 502 either has gaps or notches 506 (shown in phantom in FIG. 13A) formed therein having a width as described previously.

Referring to FIGS. 14A and 14B, trenches 509 are formed on a transparent insulator layer 550 on gate lines 508, and trenches 509 are formed parallel to the direction of gate lines 508 and between pixels. Trenches 509 in this case may not be formed by a self-aligned process. Note that a combination of trenches and ridges could be used for the passive matrix display embodiments shown in FIGS. 9–14. Trenches and/or ridges as well gaps/notches and/or additional trenches/ridges (for vertical fringe fields) may also be combined in different ways for both active and passive embodiments to achieve desired results.

Referring to FIGS. 15–19, a method for self-aligning ridges/trenches in accordance with the present invention is described in greater detail. A substrate 600 includes a mask material 602 thereon having a pattern (see e.g., FIG. 7). Mask material 602 may include a black matrix or an opaque material as described in the various embodiments above. A conductive layer 605 is preferably formed over mask material 602 or, alternately, mask material 602 can be beneath transparent conductive layer 605, or alternately, layers 602 and 605 can be separated from each other by one or more transparent insulating layers. Conductive layer 605 may be employed for pixel electrodes in an active matrix display or as one of the addressing lines in a passive matrix display. Conductive layer 605 is preferably Indium Tin Oxide (ITO) or the like. A positive tone photosensitive material 604 (removable when exposed to light) such as a resist is spun onto layer 605.

A back exposure includes directing light in the direction of arrows "C". Light is absorbed into mask material 602 and, in regions where light is not blocked, the light reaches the photosensitive layer 604 and causes a change in the chemical properties such that exposed regions 608 (FIG. 16) are removable and the remaining unexposed areas remain.

Figure 16:
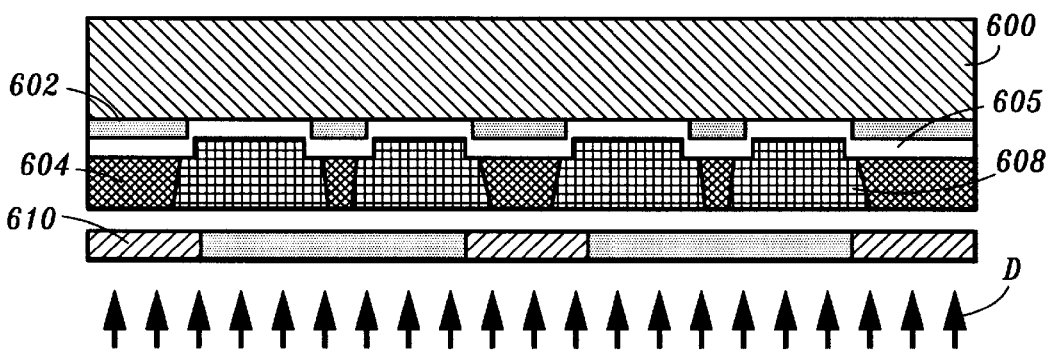
FIG. 16 is a cross-sectional view of the display device of FIG. 15 showing the resist being front exposed using a mask in accordance with the present invention.
Figure 17:
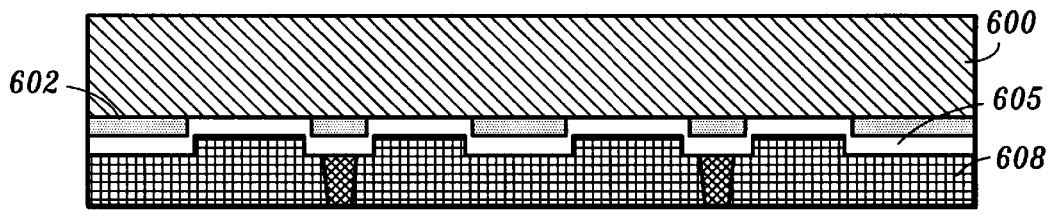
FIG. 17 is a cross-sectional view of the display device of FIG. 15 after the resist is developed to form ridges in accordance with the present invention.
Figure 18:
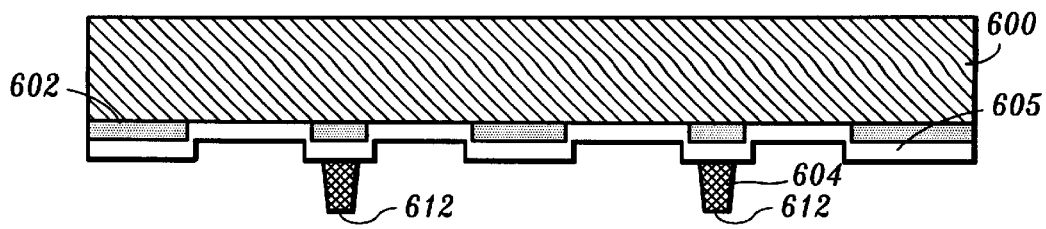
FIG. 18 is a cross-sectional view of the display device of FIG. 16 showing ridges formed in accordance with the present invention.
Figure 19:
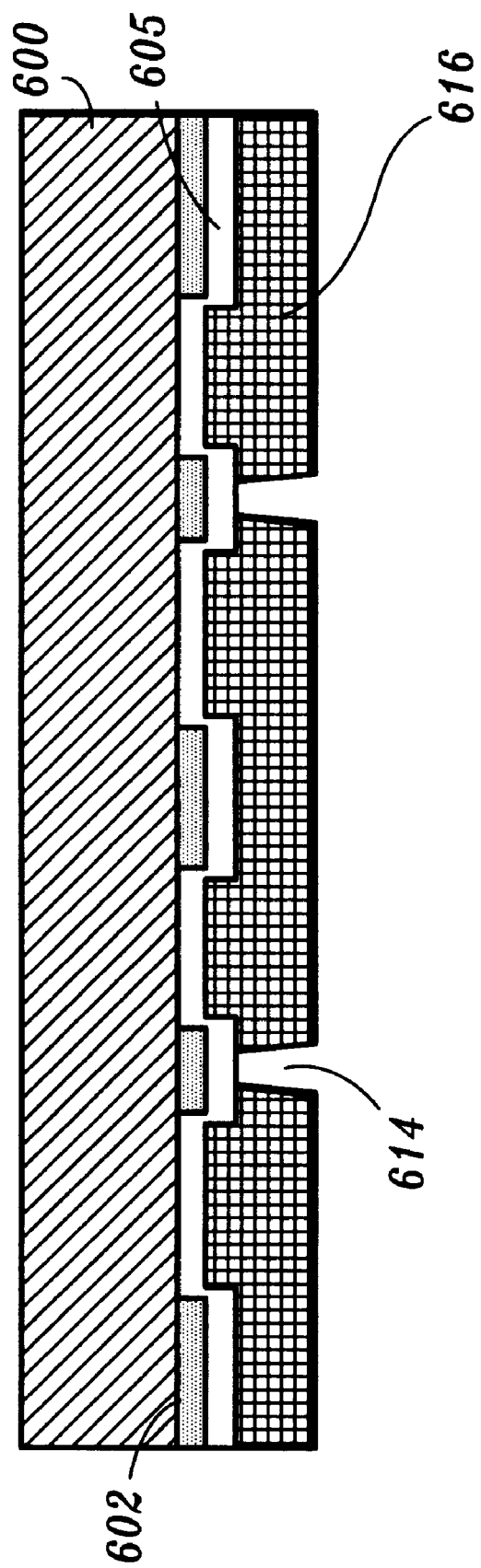
FIG. 19 is a cross-sectional view of the display device of FIG. 15 after the resist is developed to form trenches in accordance with the present invention.

Referring to FIG. 16, a front exposure is performed with light provided in the direction of arrows "D" with a mask 610 (see, e.g., FIG. 8) used to expose the areas where layer 604 remains and is not desired. As shown in FIG. 17, exposed areas 608 are extended to include all areas other than ridges 612. After developing, only the unexposed areas of layer 604, i.e., ridges 612 remain as shown in FIG. 18. In an alternate embodiment, a transparent insulating layer (not shown) may be formed on conductive layer 605 prior to spin coating layer 604. Additional processing to pattern the transparent insulating layer and remove portions of layer 604 are then needed after layer 604 is developed. To form trenches instead of ridges, a negative tone photosensitive material (i.e., stays where exposed to light) is employed. Depending on the type of resist used, i.e., positive resist or a negative resist 616 (FIG. 19), development of resist either forms ridges 612 as shown in FIG. 18 or trenches 614 as shown in FIG. 19.

The methods described above for improving the viewing angle of a passive matrix liquid crystal display with RFFMH may also be implemented without self aligning pretilt control structures. This approach may provide advantages for reflective displays where it may be desirable to provide a pretilt control structure on a non-transparent electrode or where a standard color filter plate is used where black matrix material is on the same substrate as the color filters. One advantage of this is that no transparent overcoat polymer is needed to electrically isolate the black matrix from the transparent electrode since the color filter material provides this function.

Figure 20A:
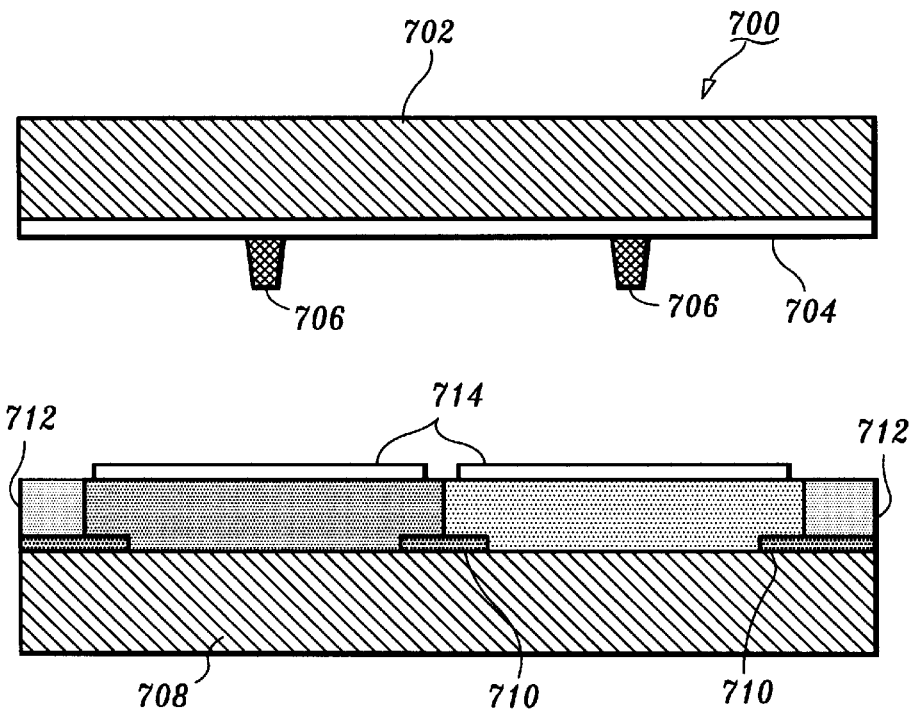
FIGS. 20A–B depict a passive display device having pretilt control structures formed thereon in accordance with the present invention.

Referring to FIG. 20A, a top glass substrate 702 for a passive display 700 includes a gate line 704 formed thereon. Ridges 706 are formed on gate line 704. A bottom glass substrate 708 includes a black matrix 710 formed thereon. Color filters 712 are disposed between data lines 714 and black matrix 710 to electrically isolate the black matrix from the transparent electrodes of data lines 714.

Figure 20B:
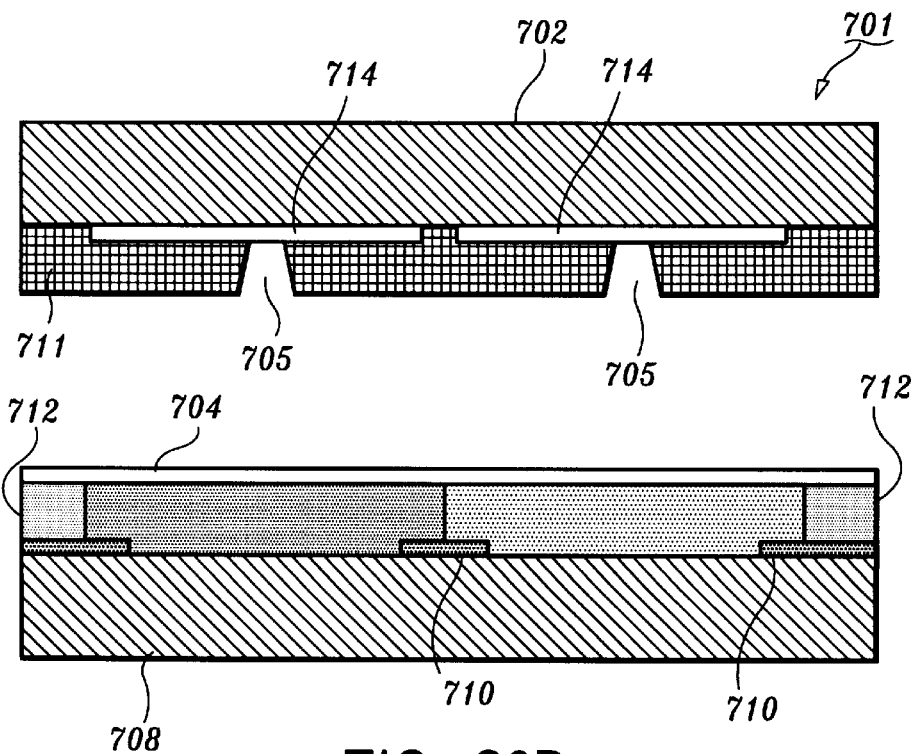

Referring to FIG. 20B, a top glass substrate 702 for a passive display 701 includes data lines 714 formed thereon. Trenches 705 are formed on data lines 714 in a transparent insulating layer 711. A bottom glass substrate 708 includes a black matrix 710 formed thereon. Color filters 712 are disposed between a gate line 704 and black matrix 710 to electrically isolate the black matrix from the transparent electrodes of gate lines 704.

The embodiments shown in FIGS. 9–14 can be implemented for the structures of FIG. 20A and 20B, namely gaps and notches, perpendicularly disposed ridges or trenches, etc. Passive matrix displays are generally not preferred for high resolution applications due to addressing limitations.

Figure 21A:
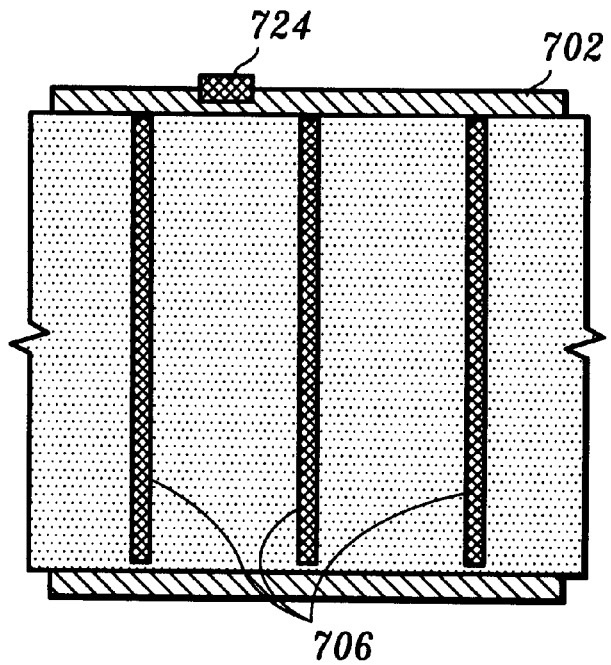
FIG. 21A is a bottom view of a top plate of a passive display showing ridges disposed over data lines in accordance with the present invention.
Figure 21B:
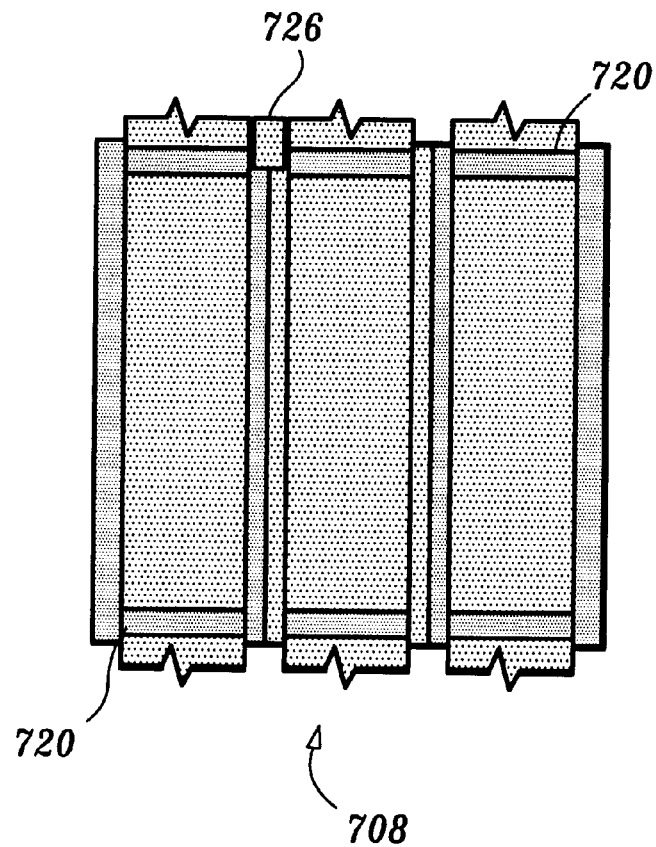
FIG. 21B is a top view of a bottom plate of a passive display showing additional ridges and structures in accordance with the present invention.
Figure 22:
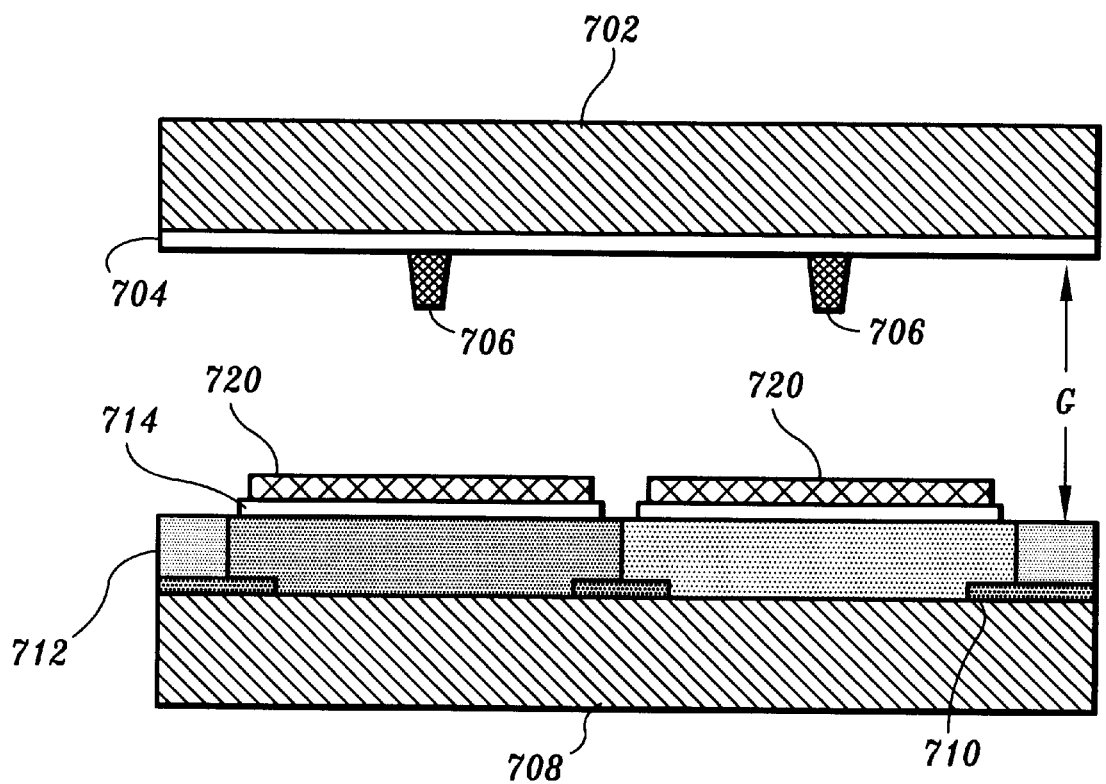
FIG. 22 is a cross-sectional view of a passive display showing ridges formed on opposite sides of a gap in accordance with the present invention.

Referring to FIGS. 21A and 21B, a bottom view of top glass 702 and a top view of bottom glass 712 are shown, respectively. In a preferred embodiment, ridges 706 and 720 may be formed on both substrates (glasses 702 and 708). Ridges 706 and 720 may configured and dimensioned to provide an appropriate gap (G) distance for a passive display as shown in FIG. 22.

Figure 23:
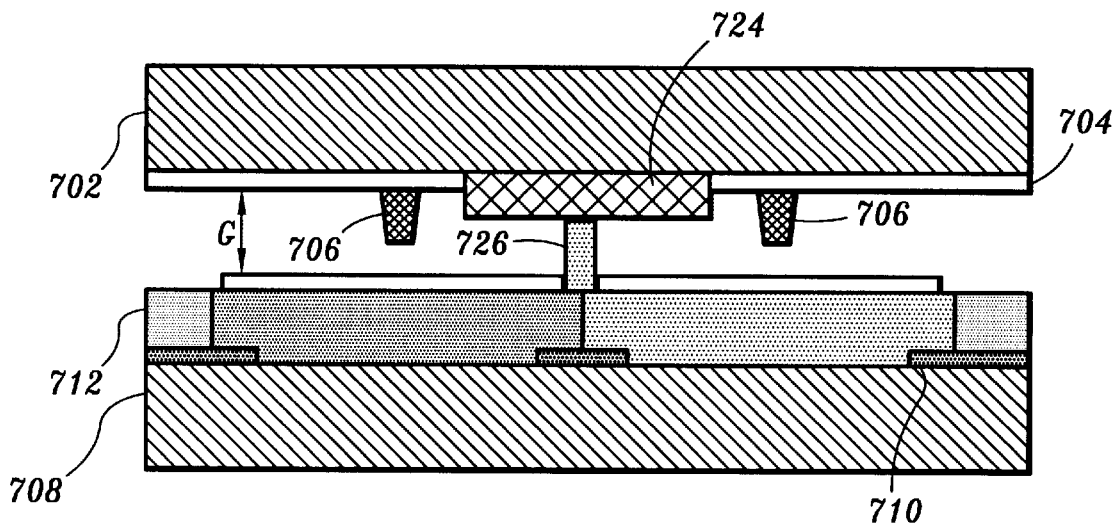
FIG. 23 is a cross-sectional view of a passive display showing gapping structures or spacers formed on opposite sides of the gap to space the gap in accordance with the present invention.

Referring to FIG. 23, patterned structures 724 (FIGS. 21A–B) may be formed in the same processing step with ridges 706. Patterned structures 724 and 726 may provide a gapping distance for gap G. Preferably, structures 724 and 726 are formed in areas where gate lines 704 and data lines 714 do not crossover. Further, structures 724 and 726 are preferably rectangular and disposed orthogonally to each other to assist in alignment of substrates 702 and 712. Structure 726 may be formed using color filter materials or layers of overlapping color filters 712 as shown in FIG. 23.

Figure 24:
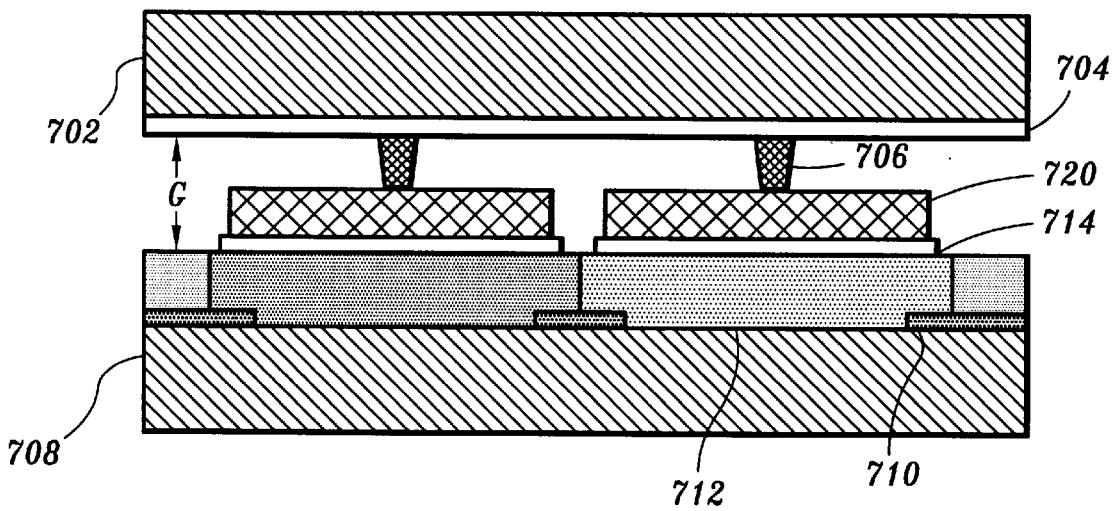
FIG. 24 is a cross-sectional view of a passive display showing ridges formed on opposite sides of the gap to provide the gap distance in accordance with the present invention.

Referring to FIG. 24, alternately, ridges 706 and 720 may be employed to provide gap G. In other embodiments, ridges 706 or 724 may be employed with patterned structures (e.g., structure 724 and 726) to provide gap G.

Although the present invention has been described in terms of passive and active liquid crystal displays, the displays described herein should not be construed as limiting. Other types of displays may employ the present invention as well, for example, monochrome or field sequential displays where no color filters are used may be employed.

The present invention provides a simple, low cost method to improve wide viewing angle using RFFMH. Ridges and/or trenches of the present invention are employed to divide pixel cells into multi-domain pixel cells. By applying an electric field across a pixel electrode and a common electrode with ridges and/or trenches (which may be disposed on either the pixel electrode or the common electrode) liquid crystal molecules line up with different orientations in each domain. In this way, light transmitted or reflected from the liquid crystal molecules is dispersed in such a way as to provide an improved viewing angle. The concept and operation of a RFFMH displays is described in "Multi-Domain Homeotropic Liquid Crystal Display Based on Ridge and Fringe Field Structure", by S-C. Lien, C. Cai, R. W. Nunes, R. A. John, E. A. Galligan, E. Colgan, and J. S. Wilson, Jpn. J. Appl. Phys. Vol. 37 (1998) pp.L597–L599, incorporated herein by reference.

The present invention has also been described in terms of double Y (or Y inverted Y) structures, multiple X structures and straight line structures for ridges and trenches. Other structures are also contemplated, for example X structures as shown in "Multi-Domain Homeotropic Liquid Crystal Display Based on Ridge and Fringe Field Structure", by S-C. Lien et al. referenced above, T structures, multiple T structures, or I structures which may include a main straight line with one or more lines perpendicular to the main straight line. In addition, ridges and trenches may include different cross-sectional profiles as shown in the commonly assigned application Ser. No. 08/960,828, previously incorporated herein by reference.

Having described preferred embodiments of structures for improved wide viewing angle for passive liquid crystal displays (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as outlined by the appended claims. Having thus described the invention with the details and particularity required by the patent laws, what is claimed and desired protected by Letters Patent is set forth in the appended claims.

What is claimed is:

1. A passive liquid crystal display cell comprising:
   a first substrate having a light absorbent material patterned thereon wherein the light absorbent material includes a conductive black matrix material;
   a first transparent conductive material formed in a position relative to the light absorbent material, the position being one of over the light absorbent material and below the light absorbent material for forming one of a data line and a gate line;
   a dielectric layer formed between the light absorbent material and the first conductive material;
   a second conductive material spaced apart from the first conductive material by a gap, the gap including liquid crystal, the second conductive material for forming the other of the data line and the gate line;
   a pretilt control structure formed adjacent to the liquid crystal, wherein the pretilt control structure is self-aligned to the portions of the light absorbent material at the crossover, and the pretilt control structure and the light absorbent material are disposed at a center of one of the first transparent conductive material and the second conductive material; and
   the gate line and the data line for providing an electric field therebetween wherein the pretilt control structure provides pretilt for the liquid crystal to provide a viewing angle.

2. The cell as recited in claim 1, wherein the pretilt control structure includes a ridge.

3. The cell as recited in claim 2, wherein the ridge includes one of a Y inverse Y structure, an X structure, a T structure, multiple X or T structures and a straight line structure on the first conductive layer.

4. The cell as recited in claim 1, wherein the pretilt control structure includes a trench.

5. The cell as recited in claim 1, wherein the second conductive material includes one of a gate line and a data line extending in a first direction, the cell further comprising one of gaps and notches disposed substantially perpendicular to the first direction and defining pixels, the gaps and the notches for providing pretilt control structures for the liquid crystal.

6. The cell as recited in claim 1, wherein the second conductive material includes one of a gate line and a data line extending in a first direction, the cell further comprising ridges disposed substantially perpendicular to the first direction and defining pixels, the ridges for providing pretilt structures for the liquid crystal.

7. The cell as recited in claim 1, wherein the pretilt control structure includes tapered side walls.

8. The cell as recited in claim 1, further comprising a transparent insulation layer disposed layer disposed on the first conductive layer and the pretilt structure includes a trench formed in the transparent insulation layer.

9. The cell as recited in claim 8, wherein the first conductive material includes one of a data line and a gate line extending in a first direction, the cell further comprising additional trenches disposed substantially perpendicular to the first direction and formed in the transparent insulation layer, the additional trenches for defining pixels and for providing pretilt control structures for the liquid crystal.

10. The cell as recited in claim 8, wherein the trench includes one of a Y inverse Y structure, an X structure, a T structure, multiple X or T structures and a straight line structure on the first conductive layer.

11. The cell as recited in claim 1, further comprising pretilt control structures formed on opposite sides of the gap.

12. The cell as recited in claim 10, wherein the pretilt control structures on a first side of the gap contact the pretilt control structures on a second side of the gap to provide a spacing for the gap.

13. The cell as recited in claim 1, further comprising gapping structures formed on opposite sides of the gap to provide a spacing for the gap.

14. The cell as recited in claim 13, wherein the gapping structures include color filter layers.

15. The cell as recited in claim 1, wherein the liquid crystal includes a negative dielectric anisotropic liquid crystal.

16. A passive liquid crystal display cell comprising:
- a first substrate having a light absorbent material patterned thereon, the light absorbent material including a portion disposed at a crossover between a data line and a gate line;
- a first transparent conductive material formed in a position relative to the light absorbent material, the position being one of over the light absorbent material and below the light absorbent material for forming one of a data line and a gate line;
- a second conductive material spaced apart from the first conductive material by a gap, the gap including liquid crystal, the second conductive material for forming the other of the data line and the gate line;
- a pretilt control structure formed at the crossover and being adjacent to the liquid crystal wherein the pretilt control structure is self-aligned to the portions of the light absorbent material at the crossover, and the pretilt control structure and the light absorbent material are disposed at a center of one of the first transparent conductive material and the second conductive material; and
- the gate line and the data line for providing an electric field therebetween wherein the pretilt control structure provides pretilt for the liquid crystal to provide a viewing angle and the portions of the light absorbent material absorb light leaked from the pretilt control structure.

17. The cell as recited in claim 16, wherein the light absorbent material includes a black matrix.

18. The cell as recited in claim 17, wherein the black matrix includes a conductive material and the cell further comprises a dielectric layer formed between the black matrix and the first conductive material.

19. The cell as recited in claim 16, wherein portions of the light absorbent material at the crossover include a width and the pretilt control structure includes a width less than the width of the portions of the light absorbent material at the crossover.

20. The cell as recited in claim 16, wherein the pretilt control structure includes a ridge having one of a Y inverse Y structure, an X structure, a T structure, multiple X or T structures and a straight line structure on the first conductive layer.

21. The cell as recited in claim 16, wherein the pretilt control structure includes a trench.

22. The cell as recited in claim 16, wherein the second conductive material includes one of a data line and a gate line extending in a first direction, the cell further comprising one of gaps and notches disposed substantially perpendicular to the first direction and defining pixels, the gaps and the notches for providing pretilt control structures for the liquid crystal.

23. The cell as recited in claim 16, wherein the second conductive material includes one of a gate line and a data line extending in a first direction, the cell further comprising ridges disposed substantially perpendicular to the first direction and defining pixels, the ridges for providing pretilt control structures for the liquid crystal.

24. The cell as recited in claim 16, wherein the pretilt control structure includes tapered side walls.

25. The cell as recited in claim 16, further comprising a transparent insulation layer and the pretilt control structure includes a trench formed in the transparent insulation layer.

26. The cell as recited in claim 25, wherein the first conductive material includes one of a gate line and a data line extending in a first direction, the cell further comprising additional trenches disposed substantially perpendicular to the first direction and formed in the transparent insulation layer, the additional trenches for defining pixels and for providing pretilt structures for the liquid crystal.

27. The cell as recited in claim 25, wherein the trench includes one of a Y inverse Y structure, an X structure, a T structure, multiple X or T structures and a straight line structure on the first conductive layer.

28. The cell as recited in claim 16, further comprising pretilt control structures formed on opposite sides of the gap.

29. The cell as recited in claim 28, wherein the pretilt control structures on a first side of the gap contact the pretilt control structures on a second side of the gap to provide a spacing for the gap.

30. The cell as recited in claim 16, further comprising gapping structures formed on opposite sides of the gap to provide a spacing for the gap.

31. The cell as recited in claim 30, wherein the gapping structures include color filter layers.

32. The cell as recited in claim 16, wherein the liquid. crystal includes a negative dielectric anisotropic liquid crystal.

33. A passive liquid crystal display cell comprising:
- a first substrate having a light absorbent material patterned thereon;
- a first transparent conductive material formed in a position relative to the light absorbent material, the position being one of over the light absorbent material and below the light absorbent material for forming one of a data line and a gate line;
- a second conductive material spaced apart from the first conductive material by a gap, the gap including liquid crystal, the second conductive material for forming the other of the data line and the gate line;
- a pretilt control structure formed adjacent to the liquid crystal wherein the pretilt control structure includes tapered side walls, wherein the pretilt control structure and the light absorbent material are disposed at a center of one of the first transparent conductive material and the second conductive material; and
- the gate line and the data line for providing an electric field therebetween wherein the pretilt structure provides pretilt for the liquid crystal to provide a viewing angle.

34. A passive liquid crystal display cell comprising:
- a first substrate having a light absorbent material patterned thereon;
- a first transparent conductive material formed in a position relative to the light absorbent material, the position being one of over the light absorbent material and below the light absorbent material for forming one of a data line and a gate line extending in a first direction;
- a second conductive material spaced apart from the first conductive material by a gap, the gap including liquid crystal, the second conductive material for forming the other of the data line and the gate line;

a pretilt control structure formed adjacent to the liquid crystal;

a transparent insulation layer disposed on the first conductive layer wherein the pretilt control structure includes a trench formed in the transparent insulation layer;

additional trenches disposed substantially perpendicular to the first direction and formed in the transparent insulation layer, the additional trenches for defining pixels and for providing pretilt control structures for the liquid crystal; and the gate line and the data line for providing an electric field therebetween wherein the pretilt structure provides pretilt for the liquid crystal to provide a viewing angle.

35. A passive liquid crystal display cell comprising:

a first substrate having a light absorbent material patterned thereon;

a first transparent conductive material formed in a position relative to the light absorbent material, the position being one of over the light absorbent material and below the light absorbent material for forming one of a data line and a gate line;

a second conductive material spaced apart from the first conductive material by a gap, the gap including liquid crystal, the second conductive material for forming the other of the data line and the gate line;

gapping structures formed on opposite sides of the gap to provide a spacing for the gap, wherein the gapping structures include color filter layers;

a pretilt control structure formed adjacent to the liquid crystal, wherein the pretilt control structure and the light absorbent material are disposed at a center of one of the first transparent conductive material and the second conductive material; and the gate line and the data line for providing an electric field therebetween wherein the pretilt structure provides pretilt for the liquid crystal to provide a viewing angle.

36. A passive liquid crystal display cell comprising:

a first substrate having a light absorbent material patterned thereon, the light absorbent material including a conductive black matrix with a portion disposed at a crossover between a data line and a gate line;

a first transparent conductive material formed in a position relative to the light absorbent material, the position being one of over the light absorbent material and below the light absorbent material for forming one of a data line and a gate line;

a dielectric layer formed between the light absorbent material and the first conductive material;

a second conductive material spaced apart from the first conductive material by a gap, the gap including liquid crystal, the second conductive material for forming the other of the data line and the gate line;

a pretilt control structure formed at the crossover and being adjacent to the liquid crystal, wherein the pretilt control structure and the light absorbent material are disposed at a center of one of the first transparent conductive material and the second conductive material; and the gate line and the data line for providing an electric field therebetween wherein the pretilt control structure provides pretilt for the liquid crystal to provide a viewing angle and the portions of the light absorbent material absorb light leaked from the pretilt control structure.

37. A passive liquid crystal display cell comprising:

a first substrate having a light absorbent material patterned thereon, the light absorbent material including a portion disposed at a crossover between a data line and a gate line;

a first transparent conductive material formed in a position relative to the light absorbent material, the position being one of over the light absorbent material and below the light absorbent material for forming one of a data line and a gate line;

a second conductive material spaced apart from the first conductive material by a gap, the gap including liquid crystal, the second conductive material for forming the other of the data line and the gate line;

a pretilt control structure formed at the crossover and being adjacent to the liquid crystal wherein the pretilt control structure includes tapered side walls, and the pretilt control structure and the light absorbent material are disposed at a center of one of the first transparent conductive material and the second conductive material; and the gate line and the data line for providing an electric field therebetween wherein the pretilt control structure provides pretilt for the liquid crystal to provide a viewing angle and the portions of the light absorbent material absorb light leaked from the pretilt control structure.

* * * * *